(12) United States Patent
Eland

(10) Patent No.: US 11,405,353 B2
(45) Date of Patent: *Aug. 2, 2022

(54) SYSTEM AND METHOD FOR GENERATING CONCURRENTLY LIVE AND TEST VERSIONS OF DNS DATA

(71) Applicant: Afilias Limited, Dublin (IE)

(72) Inventor: Howard Eland, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 10 days.

This patent is subject to a terminal disclaimer.

(21) Appl. No.: 16/930,393

(22) Filed: Jul. 16, 2020

(65) Prior Publication Data
US 2022/0021639 A1    Jan. 20, 2022

(51) Int. Cl.
*G06F 15/16*     (2006.01)
*H04L 61/4511*   (2022.01)
*H04L 9/32*      (2006.01)
*H04L 61/5076*   (2022.01)

(52) U.S. Cl.
CPC ........ *H04L 61/1511* (2013.01); *H04L 9/3247* (2013.01); *H04L 61/2076* (2013.01)

(58) Field of Classification Search
CPC .................................................... H04L 9/3247
See application file for complete search history.

(56) References Cited

U.S. PATENT DOCUMENTS

| | | | |
|---|---|---|---|
| 7,725,602 B2 | 5/2010 | Liu et al. | |
| 7,788,484 B2 | 8/2010 | Paya et al. | |
| 8,447,856 B2 | 5/2013 | Drako | |
| 8,583,806 B2 | 11/2013 | Fleischman et al. | |
| 9,130,917 B2 | 9/2015 | Smith et al. | |
| 9,479,422 B2 | 10/2016 | Sundaresan et al. | |
| 9,722,970 B2 | 8/2017 | Prince et al. | |
| 9,749,307 B2 | 8/2017 | Smith et al. | |

(Continued)

OTHER PUBLICATIONS

O. Kolkman, et al.', "DNSSEC Operational Practices, Version 2"; Dec. 22, 2012, pp. 1-71, Internet Engineering Task Force, IETF; Standard, Internet Society (ISOC) 4, Rue Des Falaises Ch—1205; Geneva, Switzerland.

(Continued)

*Primary Examiner* — Brian Whipple
*Assistant Examiner* — Gregory P Tolchinsky
(74) *Attorney, Agent, or Firm* — Haynes and Boone, LLP

(57) ABSTRACT

A system for concurrently facilitating publishing a current version of a plurality of Domain Name System (DNS) records for a domain name and storing a next version of the plurality of DNS records for the domain name, the system comprising a record selection module for obtaining selected data of registry data associated with the domain name stored in a registry database; a DNS Security (DNSSEC) signing system having at least one signing module for digitally signing the selected data of the registry data; a distribution system for coordinating concurrent generation of the current version and the next version; and the distribution system and signing system cooperating to, in part, generate the current version according to a first set of generation instructions and transmit the current version to one or more authoritative servers of the DNS in a first transmission path that bypasses storing the current version in the registry database.

21 Claims, 10 Drawing Sheets

(56) References Cited

U.S. PATENT DOCUMENTS

| | | |
|---|---|---|
| 9,992,156 B2 | 6/2018 | Tan et al. |
| 10,097,504 B2 | 10/2018 | Backholm |
| 10,158,620 B2 | 12/2018 | Smith et al. |
| 2007/0204038 A1 | 8/2007 | Majumdar et al. |
| 2010/0011420 A1 | 1/2010 | Drako et al. |
| 2010/0199122 A1* | 8/2010 | Sood .................. H04L 61/1511 714/4.1 |
| 2012/0017090 A1 | 1/2012 | Gould et al. |
| 2012/0022942 A1 | 1/2012 | Holloway et al. |
| 2012/0254386 A1 | 10/2012 | Smith et al. |
| 2013/0318602 A1 | 11/2013 | Devarapalli et al. |
| 2016/0330185 A1* | 11/2016 | Morsing ................. H04L 67/42 |
| 2017/0163425 A1 | 6/2017 | Kaliski, Jr. |
| 2020/0084178 A1 | 3/2020 | Dreyer et al. |
| 2021/0067377 A1 | 3/2021 | Beck et al. |

OTHER PUBLICATIONS

Rahul; "How to Check DNS (BIND) Configuration File"—TecAdmin.net, Apr. 4, 2013, pp. 1-8; Retrieved from the Internet: URL:https://tecadmin.net/check-dns-configuration-file-bind/ [retrieved on Oct. 22, 2021].

Müller, et al.; "Rolling With Confidence: Managing the Complexity of DNSSEC Operations", IEEE Transactions On Network and Service Management, IEEE, USA, vol. 16, No. 3, Sep. 1, 2019; pp. 1199-1211.

International Search Report for related International Patent Application No. PCT /IB2021/056439 dated Nov. 3, 2021; 4 pages.

* cited by examiner

SYSTEM AND METHOD FOR GENERATING CONCURRENTLY LIVE AND TEST VERSIONS OF DNS DATA

FIELD

The present invention is related to a DNS security system and method.

BACKGROUND

The Domain Name System (DNS) is the part of the Internet infrastructure that translates human-readable domain names into the Internet Protocol (IP) numbers needed to establish TCP/IP communications over the Internet, for example TCP and UDP. That is, DNS allows users to refer to web sites, and other resources, using easier to remember domain names, such as "www.a.b.org," rather than the numeric IP addresses, which are machine readable addresses used by software to communicate with computers on the Internet. It should be noted that a single IP address, e.g., one assigned to a single server, can support numerous domain names. That is, different domain names may resolve to the same server, that can then determine what content to provide based on the requested domain name and/or additional non-domain information.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows, in part, for users to be directed to a desired domain by a lookup process whereby the user enters the desired domain, and the DNS returns appropriate IP addresses. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers.

Although the distributed nature of the DNS provides significant advantages in terms of the efficiency of the overall system it also makes the system vulnerable to certain types of malfunctions and/or attacks at various nodes in the system. One particular problem that can occur is referred to as DNS cache poisoning. DNS cache poisoning occurs when data is introduced into a DNS name server's cache database that did not originate from authoritative DNS sources. This may result from deliberate attacks on a name server, or it may be an unintended result of, for example, a misconfigured DNS cache or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DNSSEC) is a suite of Internet Engineering Task Force (IETF) specifications for securing certain kinds of information provided by the DNS as used on IP networks. DNSSEC provides for the signing of DNSSEC-ready zone zones, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is maintained by a trusted third party.

To implement DNSSEC, several new DNS record types were created or adapted to use with DNSSEC, including RRSIG, DNSKEY, DS, NSEC, NSEC3 and NSEC3PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist. The requirements of DNSSEC involve the use of different keys, stored both in DNSKEY records and from other sources to form trust anchors. There are, for example, Key Signing Keys (KSKs), which are used to sign other DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

However, with the introduction of DNSSEC into vast registries, such as the .org registry, inefficiencies in the various signing techniques for DNSSEC data, particularly with respect to large zones, bring the potential for resolution problems including delays and resolution failures. Such problems can have significant detrimental effects on e-commerce and other high-traffic sites. Further, the ability to properly utilize storage, connection and/or computing resources of DNS components for publication of DNS records in the DNS is considered suboptimal in today's DNS environment.

Further, testing of registry data obtained from registries is not tested before DNS data is generated and subsequently published to the DNS infrastructure. Accordingly, desired is a system that can more quickly and efficiently generate and publish DNS data to the DNS, based on received registry data and updates thereto.

SUMMARY

The present invention can advantageously provide a system and/or method to obviate or mitigate at least one of the above presented disadvantages.

A first aspect provided is a system for concurrently facilitating publishing a current version of a plurality of Domain Name System (DNS) records for a domain name and storing a next version of the plurality of DNS records for the domain name, the system comprising a record selection module for obtaining selected data of registry data associated with the domain name stored in a registry database; a DNS Security (DNSSEC) signing system having at least one signing module for digitally signing the selected data of the registry data, said digitally signing using one or more signing keys (SK) to generate a signed DNS record, the one or more signing keys associated with the registry data of the domain name; a distribution system for coordinating concurrent generation of the current version and the next version; the distribution system and signing system cooperating to: generate the current version according to a first set of generation instructions and transmit the current version to one or more authoritative servers of the DNS in a first transmission path that bypasses storing of the current version in the registry database; and while the current version is operational in the DNS, generate the next version according to a second set of generation instructions and transmit the next version to a publication storage for at least one of testing or validation by a processing facility in a second transmission path that bypasses storing of the next version in the registry database; wherein the current version in the DNS and the next version in the publication storage contain different versions of at least some of the plurality of DNS records.

A second aspect provided is a method for concurrently facilitating publishing a current version of a plurality of Domain Name System (DNS) records for a domain name and storing a next version of the plurality of DNS records for the domain name, the method comprising: obtaining selected data of registry data associated with the domain name stored in a registry database; digitally signing the selected data of the registry data, said digitally signing using one or more signing keys (SK) to generate a signed DNS record, the one or more signing keys associated with the registry data of the domain name; and coordinating concurrent generation of the current version and the next version by; generating the current version according to a first set of generation instructions and transmit the current version to one or more authoritative servers of the DNS in a first transmission path that bypasses storing of the current version in the registry database; and while the current version is operational in the DNS, generating the next version according to a second set of generation instructions and transmit the next version to a publication storage for at least one of testing or validation by a processing facility in a second transmission path that bypasses storing of the next version in the registry database; wherein the current version in the DNS and the next version in the publication storage contain different versions of at least some of the plurality of DNS records.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
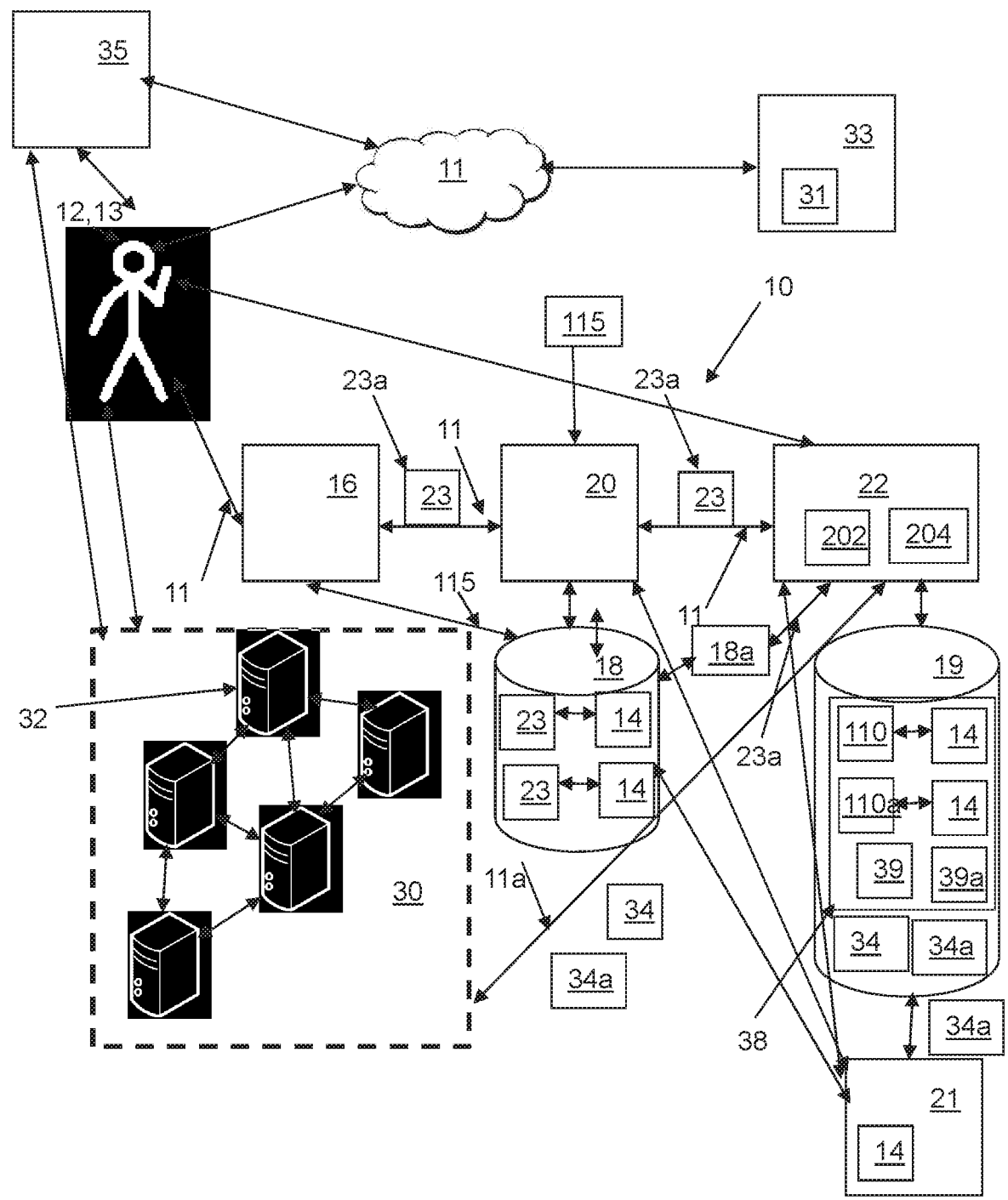
FIG. 1 is a block diagram of components of a DNS publication system.

Referring to FIG. 1, shown is a Domain Name System (DNS) publication system 10 for coordinating and publishing DNS records (e.g. DNS data 34 including one or more Resource Record sets—RR sets) in a DNS 30 containing DNS servers 32 (e.g. Authoritative servers). As further described below, the DNS servers 32 provide DNS services for users 13 of network 11 (e.g. Internet) resources 31 (e.g. as provided by a plurality of distributed web servers 33, mail servers 33, etc., as coordinated through various domain names 14 of the network 11). It is recognized that network resources 31 can be provided by one or more registry operators 20 (e.g. via registry databases 18), including external links to mail servers and/or other websites based on web page return results. The distributed servers 33 can rely upon one or more resolver servers 35, by which the network user 13 ultimately accesses network resources 31 via the DNS 30. The publication system 10 can be used for concurrently generating a live/current version DNS data 34 and a test/next version DNS data 34a, e.g. both DNS data 34,34a containing different DNS zone/record versions using the registry data of the domain name, with an option to inhibit publication of the next version DNS data 34a until testing/validation of the DNS data 34a is successful. Once tested/validated satisfactorily, the next DNS data 34a is used by the publication system 10 to replace the current DNS data 34 in the DNS 30 as update DNS data 34b, as further described below.

The DNS publication system 10 can be utilized by a registrant 12 (e.g. user 12), either directly or via the registrar 16 for example, to publish the DNS data 34 (e.g. signed and/or unsigned DNS records) associated with the domain name(s) 14 owned by the registrant 12. As further described below, the DNS data 34 is published (e.g. distributed to the various DNS servers 32) via a DNS publication service 22, also referred to as a registry service provider 22. As discussed, operation of the DNS publication system 10 for currently implemented DNS data (i.e. live DNS data implemented in the DNS 30) is referred to as DNS data 34, which was generated by the DNS publication service 22 and then transmitted/published to the DNS 30 (for subsequent implementation by the DNS servers 32, in interaction with the resolver servers 35). In other words, DNS data 34 can be referred to as the current version DNS data 34.

As further described below, DNS data 34a refers to next version DNS data that is generated by the DNS publication system 10, such that the next version DNS data remains unpublished in the DNS 30 until testing/validation is completed on the next version DNS data 34a. In other words, DNS data 34a can be referred to as the next version DNS data 34a (e.g. also referred to as test version DNS data 34a). Accordingly, the current version DNS data 34 is implemented (i.e. is live) in the DNS 30 while the next version DNS data 34a remains generated and unpublished (in the DNS 30) until testing/validation is completed/confirmed on the next version DNS data 34a by the DNS publication system 10. It is clear that the two versions of the DNS data 34,34a are in existence at the same time, i.e. concurrently, however only the current version DNS data 34 is considered implemented and thus live in the DNS 30 (i.e. published and thus actively used by the DNS servers 32 and resolver servers 35 in processing DNS requests in the DNs 30). As further described below, once the testing/validating of the next version DNS data 34a is successfully completed/confirmed, then the next version DNS data 34a becomes designated as updated DNS data 34b and the updated DNS data 34b is then sent/published to the DNS 30 in order to replace the current version DNS data 34. Thus upon successful testing/validation of the next version DNS data 34a, the resultant updated version DNS data 34b is published to the DNS 30 (e.g. received, stored and implemented by the DNS servers 32) in order to replace their current version DNS data 34.

Operation of the DNS publication system 10 for the current version of the DNS data 34 is contrasted to the operation of the DNS publication system 10 for the next (e.g. intended as updated) version DNS data 34a. The next version DNS data 34a is that DNS data 34a generated by the DNS publication service 22 in parallel (i.e. in existence concurrently) with the live version DNS data 34, however the next version DNS data 34a is not transmitted/published to the DNS 30 (for implementation by the DNS servers 32, in interaction with the resolver servers 35), rather the generated next version DNS data 34a is stored in the publication storage 19 for subsequent use in testing/validating the next version DNS data 34a while the live version DNS data 34 is actively utilized by the DNS 30. Only once the testing/validating is confirmed as successful, does the next version DNS data 34a become the updated version DNS data 34b, which is then sent to the DNS 30 as a replacement DNS data for the current version DNS data 34.

An advantage in operation of the DNS publication service 22 (as discussed above) is that while the two different versions of DNS data 34,34a are generated (and therefore in existence concurrently), only one version (i.e. current version DNS data 34) is resident in the DNS 30 (i.e. published). Only once the next version DNS data 34a is successfully tested/validated, does the next version DNS data 34a become the updated version DNS data 34b and thus sent (i.e. published) to the DNS 30 as a replacement to the current version DNS data 34. As such, advantageously the same DNS publication system 22 infrastructure (further discussed below) can be used to generate concurrent DNS data versions while at the same time inhibiting publication (to the DNS 30) of one of the concurrent DNS data versions (i.e. the next version DNS data 34a).

Figure 6A:
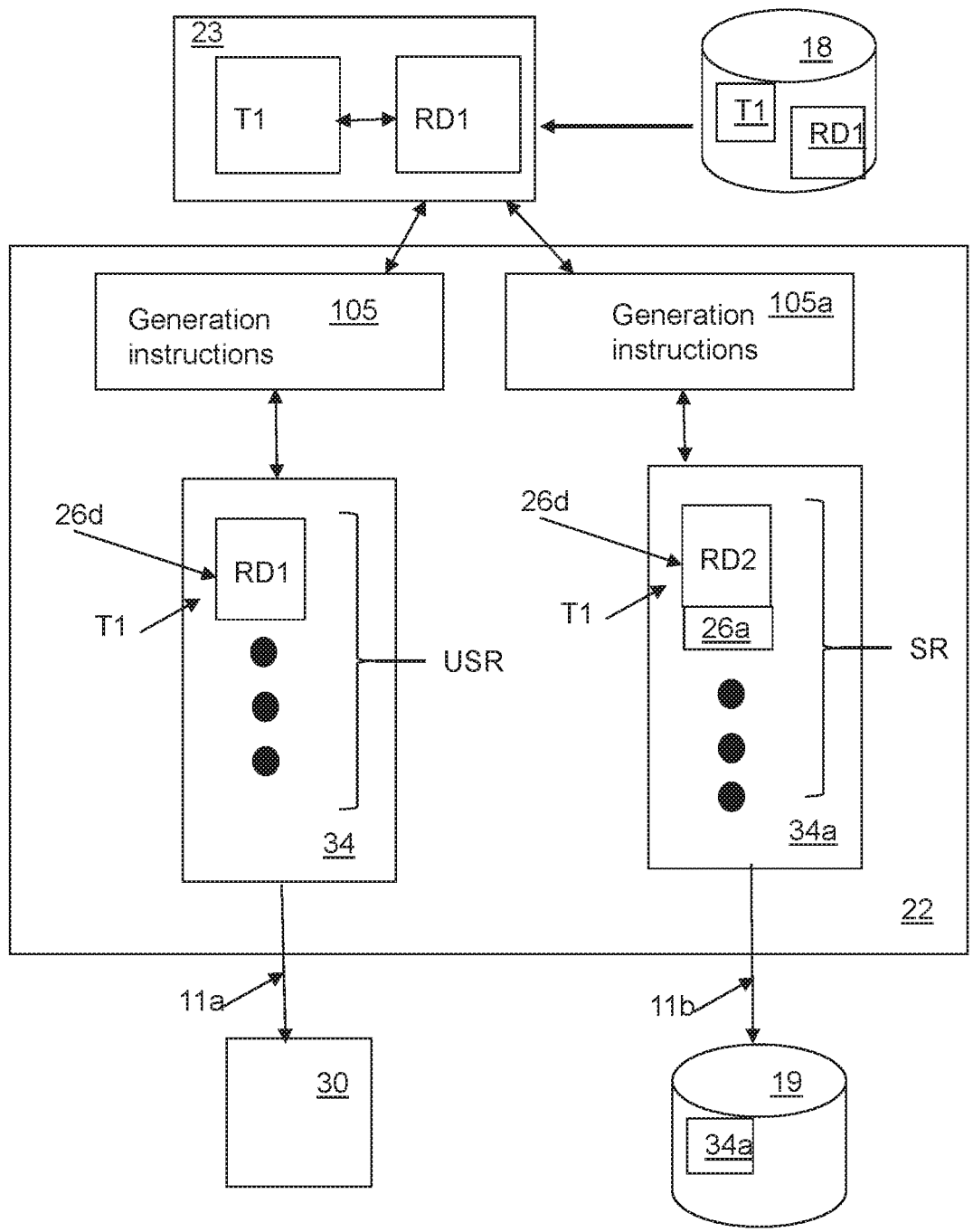
FIGS. 6a,b,c,d show example block diagrams for different operational embodiments of the DNS publication system of FIG. 3.

Symbolically shown in FIG. 6a, is operation of the DNS publication service 22 pertaining to a first set of registry data RD1 (e.g. registry data 23 as obtained from the registry database 18) and a second set of registry data RD2 (e.g. registry data 23 as obtained from the registry database 18). The first set of registry data RD1 is operated on by the DNS publication service 22 using first generating instructions 105 in order to generate (and publish to the DNS 30) the considered current version DNS data 34. The generation and publication of the current version DNS data 34 could be performed prior to the generation of the next version DNS data 34a (using the respective second set of registry data RD2 and associated second generating instructions 105a). It is recognized that the second set of registry data RD2 contains data changes (e.g. additions/modifications/deletions to registration data and/or DNS zone data) as compared to the first set of registry data RD1. Similarly, the first generating instructions 105 can contain generating instructions particular to the data contents of the first set of registry data RD1 while the second generating instructions 105a can contain generating instructions particular to the data contents of the second set of registry data RD2. In other words, the data contents of the first set of registry data RD1 is different to the data contents of the second set of registry data RD2. Similarly, the instruction contents of the first generating instructions 105 could be different from the instruction contents of the second generating instructions 105a, or, the instruction contents of the first generating instructions 105 could be the same as the instruction contents of the second generating instructions 105a (e.g. for minor changes to the registry data RD2 over that of RD1—for example simply adding more instance(s) of the same record type(s)).

Generating instructions 105,105a may be just configured to a sign a zone, by looking for record types and then for conditions based on record type. For example, a set of NS records that are delegations to a child zone (they are never signed), NS1 and NS2 for example. When new name servers NS3 and NS4 are added in the next DNS data 34a (i.e. were not present in the current DNS data 34), the generating instructions 105a just treats NS3 and NS4 the same way as the instances for NS1 and NS2. Therefore the generating instructions 105a are just looking for more instances of the same type. In this manner, the generating instructions 105 content for processing name server records (for NS1 and NS2 in the current DNS data 34) would be the same generating instructions 105a content for processing name server records NS1, NS2, NS3, NS4 in the next DNS data 34a, as the added name server records NS3, NS4 are just further instances of the same type and are therefore processed the same as one would for the already (i.e. current) name server records NS1, NS2. Alternatively, for example, rolling the ZSK KEY as part of the generating instructions 105a for the next DNS data 34a would require additional generating instructions 105a content that would not be present in the generating instructions 105 content, as rolling of a ZSK key could be a one time instruction change as a resigning event for the entire zone as represented by the next DNS data 34a.

Accordingly, in some embodiments the generating instructions 105 content could be the same as the generating instructions 105a content (e.g. in the case where the next DNS data 34a only contains more instances of all the same record types as contained in the current DNS data 34). In other words, the generating instructions 105 could be the same set of generating instructions for processing the current DNS data 34 and the next DNS data 34a. In other words, in this example of same record types (between the two different DNS data 34, 34a), the generating instructions 105 and the generating instructions 105a could be interchangeable.

Alternatively, in some embodiments the generating instructions 105 content could be different from the generating instructions 105a content (e.g. in the case where the next DNS data 34a different record types as contained in the current DNS data 34). In other words, the generating instructions 105 could be a different set of generating instructions for processing the current DNS data 34, while the generating instructions 105a (having different instruction content to that of the generating instructions 105) would be used to process the next DNS data 34a. In other words, in this example of different record types (either added or deleted record types between the two different DNS data 34, 34a), the generating instructions 105 and the generating instructions 105a would not be interchangeable.

For example, the DNS publication service 22 would receive the first set of registry data RD1 and the associated first generating instructions 105, for use in generating and publishing the current version DNS data 34. Similarly, the DNS publication service 22 would receive the second set of registry data RD2 and the associated second generating instructions 105a, for use in generating and testing/validating the next version DNS data 34a while the current version DNS data 34 remains operational (i.e. implemented) in the DNS 30.

In view of the above, in general, there are multiple embodiments envisioned for the signed/unsigned state of the different version DNS data 34,34a. For example, the current version DNS data 34 could represent an unsigned zone for the domain(s) and the next version DNS data 34a could also represent an unsigned zone for the domain(s). For example, the current version DNS data 34 could represent an unsigned zone for the domain(s) and the next version DNS data 34a could represent a signed zone for the domain(s). For example, the current version DNS data 34 could represent a signed zone for the domain(s) and the next version DNS data 34a could represent an unsigned zone for the domain(s). For example, the current version DNS data 34 could represent a signed zone for the domain(s) and the next version DNS data 34a could also represent a signed zone for the domain(s). It is also recognised that the DNS publication service 22 is configured to facilitate the sending of a signed version of the DNS data 34a or an unsigned version of the DNS data 34a as the updated version DNS data 34b to the DNS 30, depending upon the configuration (e.g. using one or more signing identifiers 110 as further discussed below) of the domain name 14 of the registrant 12.

Further to the above, it is also recognized that the DNS publication service 22 could receive multiple different sets of the second set of registry data (e.g. RD2, RD2', RD2", etc.) and the associated different sets of second generating instructions (e.g. 105a, 105a', 105a", etc.). In this manner, the DNS publication service 22 could implement testing/validation of multiple different versions of the next version DNS data 34a, 34a', 34a", etc. at the same time before deciding which of the next version DNs data 34a, 34a', 34a" to use as the updated DNS data 34b. Further, the data contents of the multiple sets of registry data RD2, RD2', RD2" would be different from one another as well as different from the data contents of the first set of registry data RD1. Similarly, the instruction contents of the multiple sets of second generating instructions 105a, 105a', 105a" would be different from one another as well as different from the instruction contents of the first generating instructions 105.

Publication (Option)

Once the DNS publication service 22 receives the set of registry data RD1,RD2 and associated generating instructions 105,105a, the DNS publication service 22 can determine whether to send/publish the generated DNS data (to the DNS 30) or to retain the generated DNs data for testing/validation (for storing in the publication storage 19), by utilizing a publication identifier 39. In other words, once received, the set of registry data RD1,RD2 could be intended for processing and subsequent publication in the DNS 30, thus bypassing the publication storage 19 and associated testing/validation thereof.

For example, based on the publication identifier 39, a decision can be made whether to publish the generated DNS data or to store (e.g. in publication storage 19) the generated DNS data for subsequent testing/validation. In other words, the DNS publication service 22 can have in existence two of more concurrently generated (i.e. in existence at the same time) sets of DNS data 34,34a from selected data (e.g. registry data RD1, RD2, RD2', etc.) obtained from the registry database 18 (i.e. data stored in the registry database 18 used to define one or more zones of domain names 14 maintained/implemented by the registrants 12 for facilitating operation of the network resources 31). The publication identifier 39 can be used to direct the DNS publication service 22 to publish the generated DNS data 34 or to inhibit publishing (withhold the generated DNS data 34a from the DNS 30) of the DNS data 34a and instead store the generated DNS data 34a for subsequent testing/validation. If the publication identifier 39 indicates that the DNS data (once generated) should be published, then the DNS publication service 22 would transmit the DNS data (e.g. the current version DNS data 34 or the updated version DNS data 34b) via a network transmission path 11a.

Accordingly, as noted herein, the generated resource records 26 and resultant current/updated DNS data 34 are not stored in the registry database 18, rather the DNS data 34 (containing the signed/unsigned resource records 26 for use in implementing the current operation of the DNS 30) are published directly to the DNS 30 using the transmission path 11a, while the next version DNS data 34a is stored directly in the publication storage 19 in a transmission path 11b that also preferably bypasses the registry database 18. In other words, preferably, the publication storage 19 is separate from the registry database 18, such that that the publication storage 19 (containing the next version DNS data 34a) is not accessible by the resolver servers 35. Further, it is recognized that the DNS servers 32 of the DNS 30 do not have access (are inhibited) from accessing the stored next version DNS data 34a, such that the next version DNS data 34a is not used to implement access to the network resources 31 by the DNS 30 (working in tandem with the resolver servers 35 operating in conjunction with the computing network devices of the users 12,13).

Signed/Unsigned Domain Embodiments of the DNS Data 34,34a

In various embodiments, the different versions of the DNS data 34,34a can represent signed or unsigned domains. As recognized, depending upon the signing identifier(s) 110 associated with generating instructions 105 for the production/generation of the DNS data 34, see FIG. 3, the DNS publication service 22 can decide on how to transform the selected data (i.e. registry data 23) received into the corresponding DNS records of the DNS data 34 (e.g. signed records SR or unsigned records USR of an entire domain on a record type 26c by record type 26c basis—see FIG. 2).

It is recognized, as further described below, that the DNS data 34 can be considered an "unsigned" version of the DNS record(s) 26 (see FIG. 2) that the DNS data 34 contains and the DNS data 34a can be considered a "signed" version of the DNS record(s) 26 that the DNS data 34a contains, such that the DNS data 34a contains signed DNS records 26 that are absent from the DNS data 34. One example of the unsigned DNS data 34 is for an unsigned zone (i.e. containing no DNSSEC related DNS records 26) while the signed DNS data 34a contains one or more DNSSEC related records 26) according to DNSSEC protocol (e.g. DNSSEC related generation instructions 105a—see FIG. 3.

As further described below, the first set of DNS data 34 can contain only unsigned DNS records (defining an unsigned domain for the domain name 14) and the second set of DNS data 34a can contain one or more signed DNS records (e.g. all signed records or a mixture of signed and unsigned records as dictated by the generation instructions 105a). An advantage of utilizing the DNS publication service 22 to generate the various version DNS data 34,34a (for the same domain using selected registry data RD1,RD2 versions of the registry data 23) in parallel (i.e. having two or more different versions of the generated DNS data in existence at the same time), is where the registrant 12 is considering converting their domain name 14 from an unsigned domain to a signed domain (or for example changing at least one of the resource record types 26c in the DNS data 34 from unsigned to signed in the DNS data 34a). As such, the domain name 14 can continue to be operated as an unsigned domain (or selected unsigned resource records types 26c thereof) while simultaneously generating a signed version of the domain (or selected signed resource records types 26c thereof) for testing purposes (e.g. via testing facilities 21) in conjunction with continued operation/implementation of the current unsigned/signed version (DNS data 34) of the domain via the DNS 30.

As discussed, a current/updated version of the DNS data 34,34b is the DNS data that is generated by the DNS publication service 22 and then subsequently transmitted/published to the DNS 30 for implementation by the DNS servers 32, in interaction with the resolver servers 35. This current/updated operation of the DNS data 34,34b is contrasted to the next version of the DNS data 34a. The next version DNS data 34a is that DNS data 34 generated by the DNS publication service 22 in conjunction with the current version DNS data 34, however the next version DNS data 34a is not transmitted/published to the DNS 30 (for implementation by the DNS servers 32, in interaction with the resolver servers 35), rather the generated next version DNS data 34a is stored in the publication storage 19 for subsequent use in testing/validating the next version DNS data 34a while the current version DNS data 34 is actively utilized by the DNS 30. In this embodiment, the registrant 12 (for example) would use the DNS publication service 22 to change unsigned DNS records USR in the DNS data 34 to signed DNS records SR in the DNS data 34a (i.e. the DNS data 34 is the current version and the DNS data 34a is the next version). For sake of ease of description purposes only for this embodiment, the DNS data 34 is considered as the unsigned DNS data 34 version and the DNS data 34a is considered as the signed DNS data 34a version, as the DNS data 34a contains selected signature records 26a that are not contained in the DNS data 34.

It is also recognized that alternatively, a different embodiment of the DNS publication service 22 is such that the current version operation of the DNS data is the signed DNS data 34 that is generated by the DNS publication service 22 and then transmitted/published to the DNS 30 for implementation by the DNS servers 32, in interaction with the resolver servers 35. This current version of the DNS data 34 is contrasted to the previous unsigned embodiment of the DNS data 34. In this signed embodiment, the registrant 12 (for example) would use the DNS publication service 22 to change signed DNS records SR in the DNS data 34 to unsigned DNS records USR in the DNS data 34b (i.e. the DNS data 34 is the current signed version and the DNS data 34b is the updated unsigned version).

Different Signed Versions

In view of the above, it is recognized that the DNS publication service 22 is responsible for creating/maintaining the DNS data 34,34b resident on the DNS servers 32, such that the live DNS data 34,34b in the DNS 30 requires consistent updating/changing depending upon Registry object 23 changes (e.g. updates/creations/deletions/modifications) affecting data pertinent to (or otherwise affecting) the DNS resource records 26 (of the live DNS data 34,34b) as performed by the registry operator 20 during operation/maintenance of the domain names 14 of the registry database 18. It is recognized that the registry database 18 contains registry objects 23 (otherwise referred to as registry data 23—including contact objects 23, host objects 23, and other domain objects 23—e.g. such as registrant name, domain renewal date, domain creation date) amongst other registry data 23 pertinent to the creation and maintaining of the respective domain name(s) 14, including data relevant to resource records 26 used to populate the DNS data 34,34a (as generated by the DNS publication service 22). It is changes to these registry data 23 (e.g. due to EPP transactions performed on the registry data 23 in the registry database 18) that may necessitate changes (e.g. updates and/or newly created DNS records 26) to the current DNS data 34. As discussed above, in the event that testing/validating of the changes to the registry data 23 is desired, then the publication identifier 39 is used to signify whether the DNS publication service uses the transmission path 11a (sending the generated DNS data 34 directly to the DNS 30) or the transmission path 11b (sending the generated DNS data 34a directly to the publication storage 19 for subsequent testing/validating before potentially sending as updated version DNS data 34b to the DNS 30).

As such, the registrant 12 and/or the registrar 16 (or for that matter the DNS publication service 22 and/or the registry operator 20) can decide to implement a different version (e.g. as identified by a uniquely assigned DNS version serial number, such that DNS data 34 would have a different serial number from the serial number of DNS data 34a) of the DNS record(s) 26. In this manner, one or more versions of the DNS data 34,34a can be generated concurrently by the DNS publication service 22, using the different sets of generation instructions 105,105a. For example, the current version DNS data 34 can be generated and sent to the DNS 30 while the next version DNS data 34a can be generated and sent to the publication storage 19, recognizing that the publication storage 19 is not (i.e. is separate from) the registry database 18. AS such, it is recognized that the assigned DNS version serial number of the next DNS data 34a and the update DNS data 34b could have the same version serial number, as the update DNS data 34b represents the validates/tested/confirmed next DNS data 34a.

Embodiments for Changes to Signed Records (SR) Shown in FIGS. 6a,b,c,d

Figure 2:
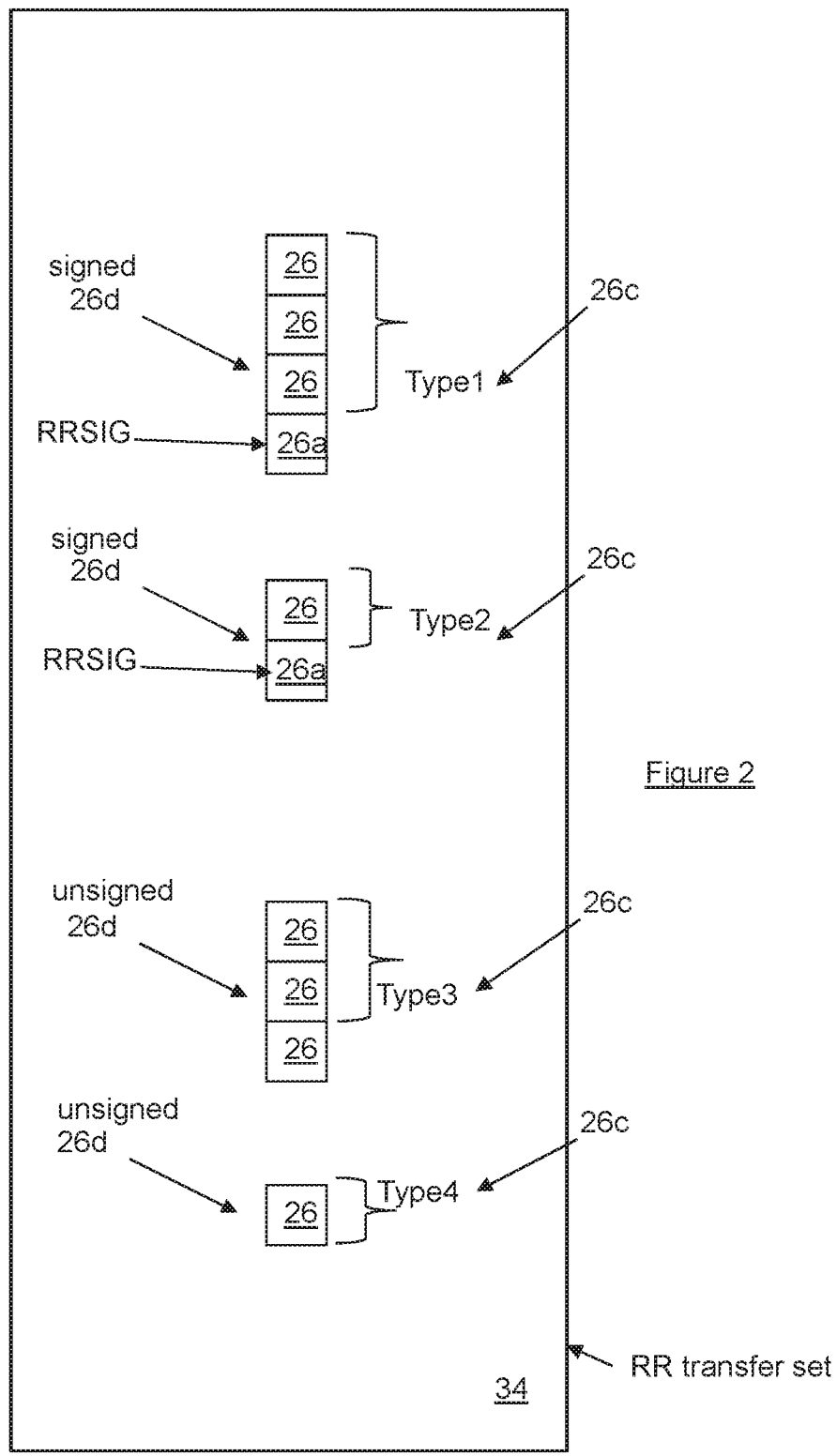
FIG. 2 is a block diagram of an example form of DNS data for the system of FIG. 1.

In one embodiment, it is recognized that the considered unsigned version of the DNS data 34 can be a completely unsigned domain, e.g. all of the resource record types 26c—see FIG. 2—of the DNS data 34 are considered unsigned. Similarly, the considered signed version of the DNS data 34a can be a completely signed domain, e.g. all of the resource record types 26c—see FIG. 2—of the DNS data 34a are considered signed. This is symbolically shown in FIG. 6a, such that the registry data 23 (e.g. RD1,RD2—registry data 23 as obtained from the registry database 18) is treated differently by the two different sets of generation instructions 105, 105a (e.g. a first generation instruction set 105 and a second set of generation instruction 105a as implemented by the DNS publication service 22), in order to produce the signed records SR and unsigned records USR containing the registry data 23 (e.g. the signed records SR also contain a signature record 26a that it absent from the unsigned records USR). It is recognized that signed records SR (e.g. for the registry data 23) can be part of the DNS data 34a and unsigned records USR (for the same data 23) can be part of the DNS data 34. Further, for example, the signed records SR can be embodied as an RR set 26*d* having the respective signature record 26*a* (see FIG. 2) for a specified resource record type T1 (e.g. one of the resource record types 26*c* as defined in the generation instructions 105*a*). Further, for example, the unsigned records USR can be embodied as an RR set 26*d* not having (i.e. absent or otherwise having a null value) the respective signature record 26*a* (see FIG. 2) for the same specified resource record type T1 (as defined in the generation instructions 105) of the registry data 23 (see FIG. 6*a*).

Figure 6B:
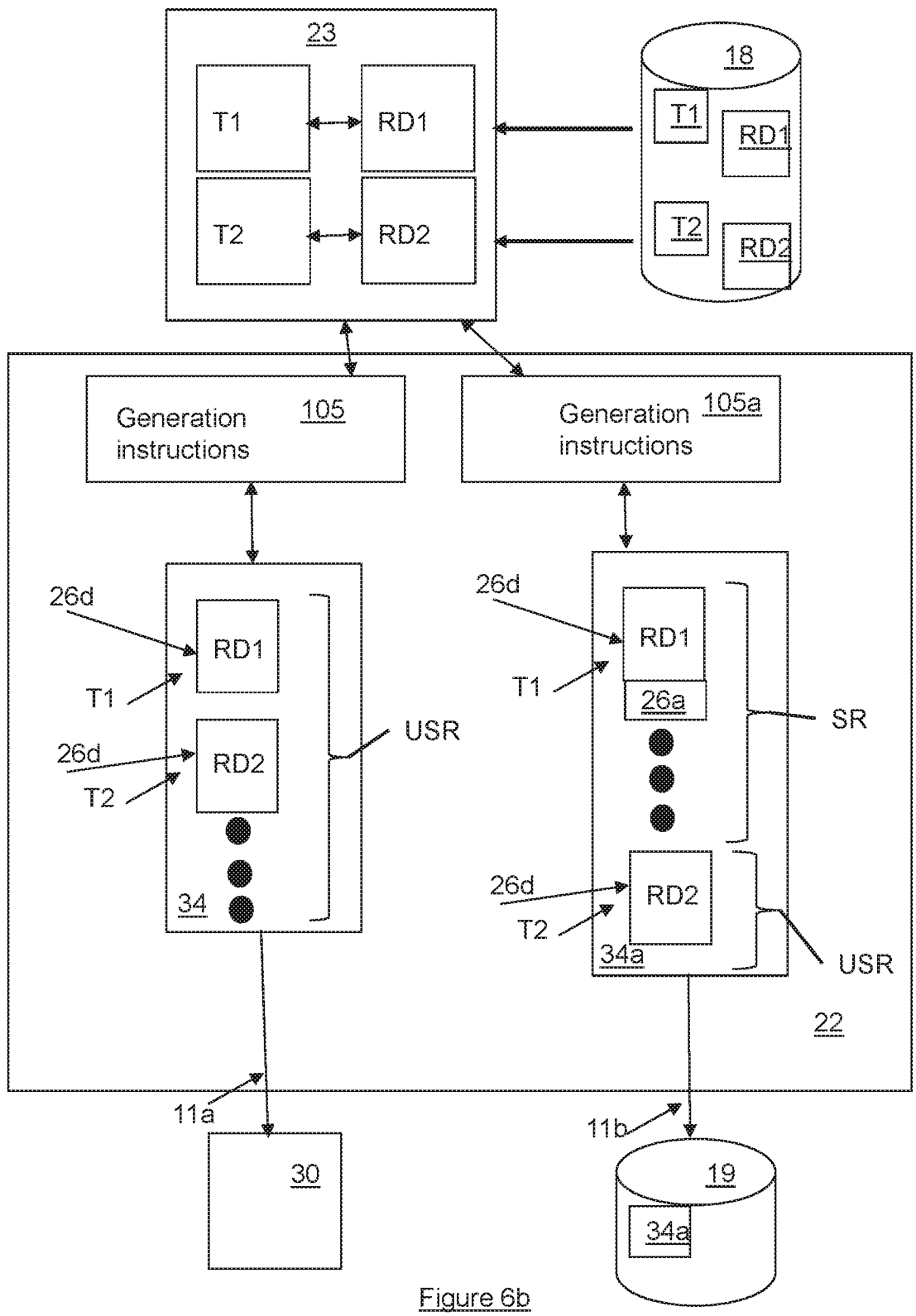
Figure 6C:
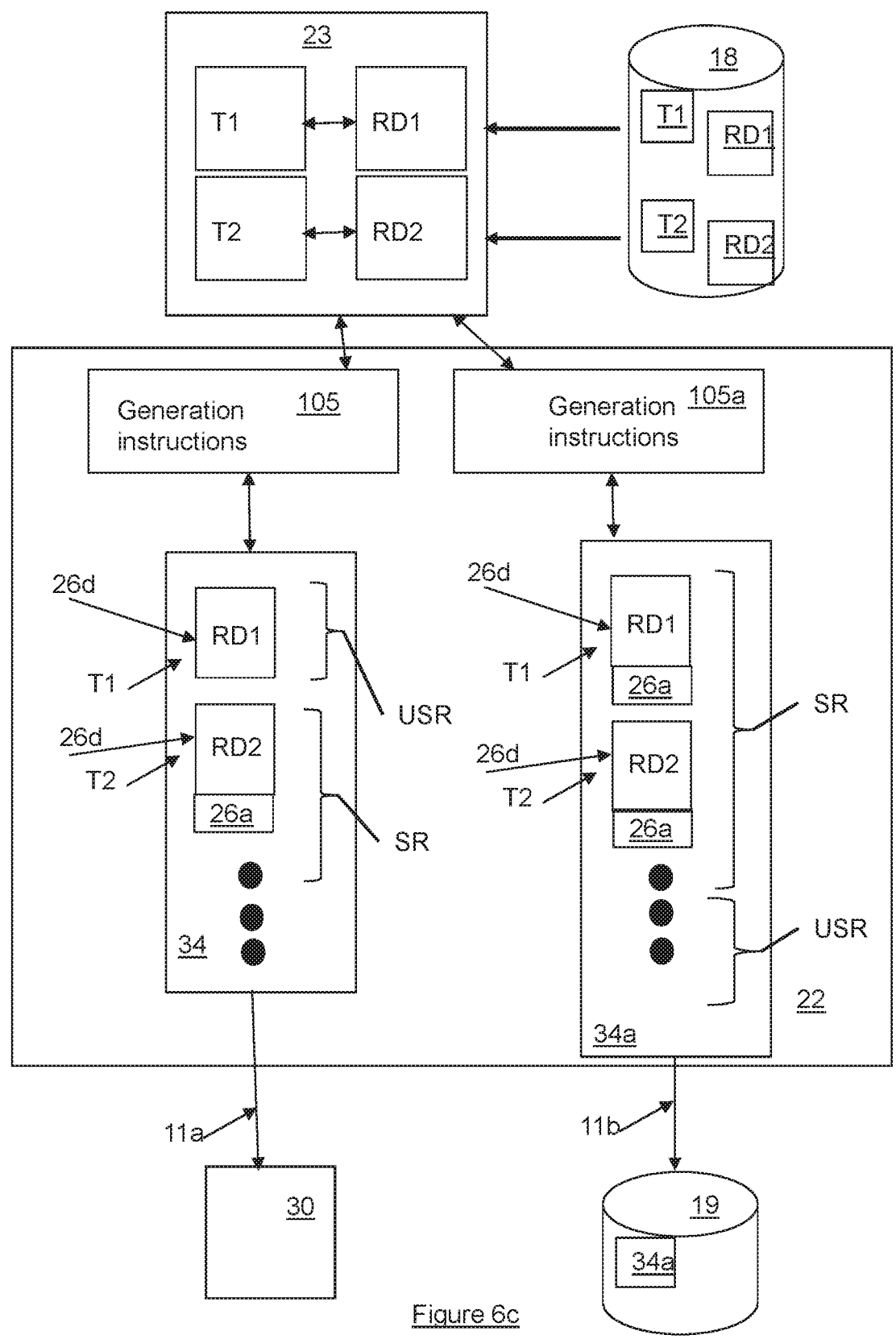
Figure 6D:
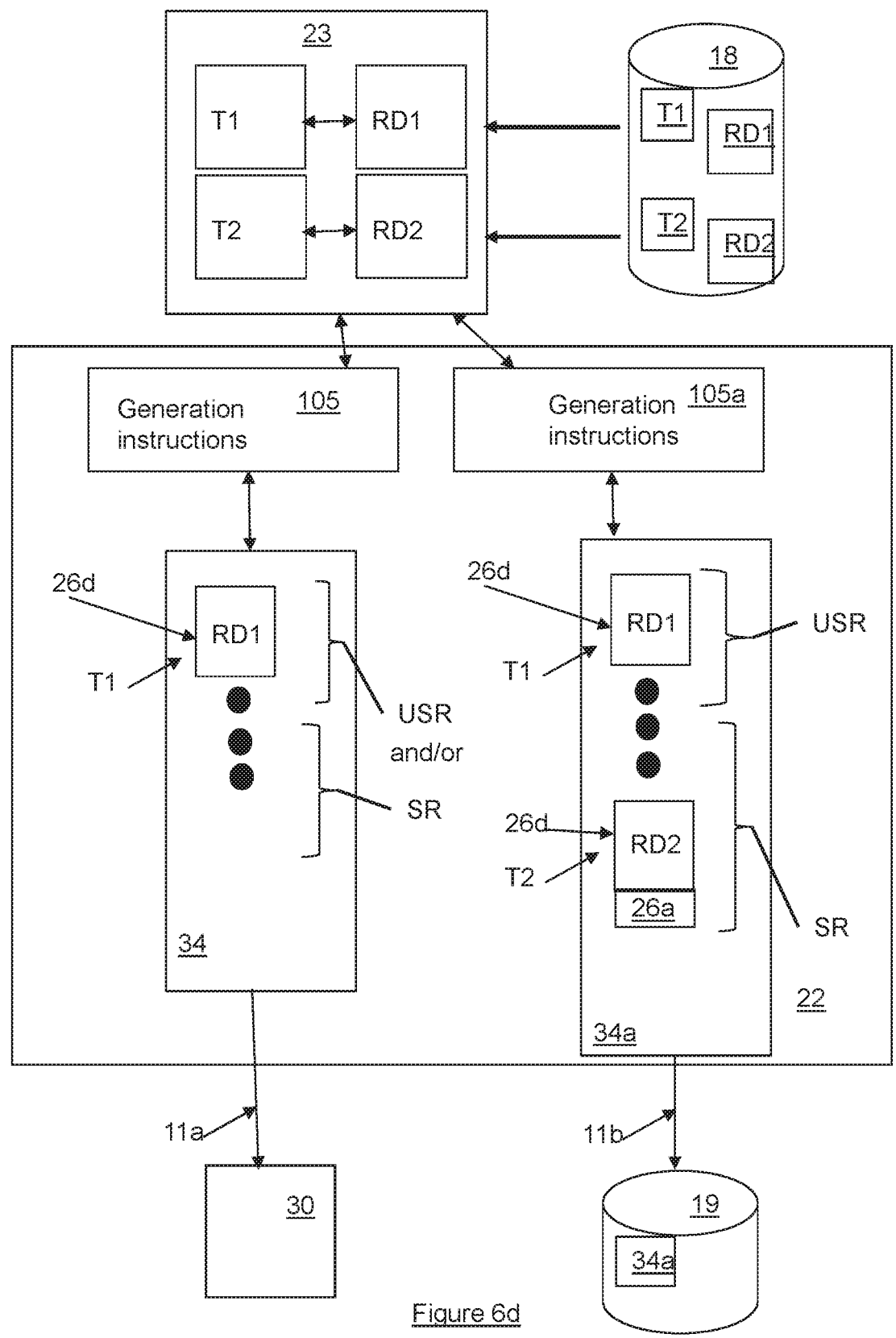

In further embodiments see FIGS. 6*b*,6*c*,6*d*, it is recognized that the considered unsigned version of the DNS data 34 can be a completely unsigned domain, e.g. all of the resource record types 26*c*—see FIG. 2—of the DNS data 34 are considered unsigned. Similarly, the considered signed version of the DNS data 34*a* can be a signed domain, e.g. at least one or more of the resource record types 26*c*—see FIG. 2—of the DNS data 34*a* are considered signed. This is symbolically shown in FIG. 6*b*, such that different sets of the registry data RD1,RD2 (e.g. registry data 23 as obtained from the registry database 18) are treated differently by the two different sets of generation instructions 105, 105*a* (e.g. a first generation instruction set 105 and a second set of generation instruction 105*a* as implemented by the DNS publication service 22), in order to produce the signed records SR and unsigned records USR containing the registry data 23 (e.g. the signed records SR also contain a signature record 26*a* that it absent from the unsigned records USR). It is recognized that the signed records SR can be part of the DNS data 34*a* and the unsigned records USR can be part of the DNS data 34. Further, for example, the signed records SR can be embodied as an RR set 26*d* having the respective signature record 26*a* (see FIG. 2) for a specified resource record type T1 (as defined in the generation instructions 105*a*). Further, for example, the unsigned records USR can be embodied as an RR set 26*d* not having (i.e. absent or otherwise having a null value) the respective signature record 26*a* (see FIG. 2) for the same specified resource record type T1 (as defined in the generation instructions 105) of the registry data 23. As such, the DNS data 34*a* can also have registry data 23 of a different resource record type T2 (to that of type T1—e.g. the type T2 also one of the resource record types 26*c* as defined in the generation instructions 105*a*).

In a further embodiment, for example in FIG. 6*c*, it is recognized that the considered unsigned version of the DNS data 34 can be a signed domain including one or more unsigned resource record types 26*c*, e.g. type T1 for registry data RD1, such that selected resource record type T1 of the DNS data 34 are defined as unsigned records USR in the generation instructions 105. Further, the DNS data 34 can also contain signed records SR for other registry data 23 for a different record type T2, such that the resource record type T2 of the DNS data 34 is defined as signed records SR in the generation instructions 105. Similarly, the considered signed version of the DNS data 34*a* can also be a considered signed domain, including one or more signed resource record types 26*c*, e.g. types T1, T2, however the difference being that the selected resource record type T1 in the DNS data 34 (defined as unsigned) is defined as a signed type T1 in the generation instructions 105*a* for the DNS data 34*a*. In this embodiment, DNS data 34 contains unsigned resource records USR (e.g. RR set 26*d*) corresponding to selected registry data 23 (e.g. RD1 pertaining to a specified type T1 in the generating instructions 105 for the DNS data 34), while the DNS data 34*a* contains signed resource records SR corresponding to the selected registry data 23 (RD2 pertaining to the same specified type T1 in the generating instructions 105 for the DNS data 34). Hence the generating instructions 105 for the specified type T1 designate as unsigned for the DNS data 34 associated with the registry data 23, while the generating instructions 105*a* for the same specified type T1 designate as signed for the DNS data 34*a* associated with the registry data 23.

A further embodiment of the DNS data 34,34*a*, for example in FIG. 6*d*, can be such that the considered unsigned version of the DNS data 34 can be a signed domain (or unsigned domain) including one or more unsigned resource record types 26*c*, e.g. type T1 for registry data RD1, such that selected resource record type T1 of the DNS data 34 is defined as unsigned records USR in the generation instructions 105. Further, the DNS data 34*a* can also contain signed records SR for other registry data 23 (e.g. RD2) for a different record type T2, such that the resource record type T2 of the DNS data 34*a* is defined as signed records SR in the generation instructions 105*a*. It is clear that the DNS data 34 does not contain any resource records (e.g. RR set 26*d* containing the registry data RD2 for a specified record type T2). Similarly, the considered signed version of the DNS data 34*a* can also be a considered signed domain, including one or more signed resource record types 26*c*, e.g. type T2, however the difference being that the selected resource record type T2 (and registry data RD2) is not in the DNS data 34 (i.e. the record type T2 is absent from the generation instructions 105 for the DNS data 34). In this embodiment, DNS data 34 contains unsigned resource records USR (e.g. RR set 26*d*) corresponding to selected registry data RD1 (pertaining to a specified type T1 in the generating instructions 105 for the DNS data 34), while the DNS data 34*a* contains signed resource records SR corresponding to a different selected registry data RD2 (pertaining to a different specified type T2 that is absent from the generating instructions 105 for the DNS data 34). Hence the generating instructions 105 do not contain any specified type T2 (e.g. resource record 26 fields and/or definitions associated with the type T2) and as such the DNS data 34 does not contain the registry data RD2. On the other hand, the generating instructions 105*a* for the different specified type T2 designates as signed for the DNS data 34*a* associated with the registry data RD2 (which are in addition to the registry data 23 of the DNS data 34 only containing the registry data RD1 and not the registry data RD2).

In view of the above presented example embodiments (see FIGS. 6*a*,*b*,*c*,*d*), it is considered that the DNS data 34*a* contains RR set(s) 26*d* having signatures (e.g. signature record(s) 26*a*) that are not contained in the DNS data 34 for a particular resource record type 26*c*. Further, the DNS data 34 and the DNS data 34*a* can contain both signed records SR and/or unsigned records USR, depending upon the definition of resource record types 26*c* in the corresponding generation instructions 105,105*a*. It is also recognized that for generation instructions 105,105*a* containing signing instructions (e.g. specifying the use of the one or more signature modules 204*b*—see FIG. 3—for selected resource types 26*c*), these signing instructions would also contain definitions of key records for the zone apex (e.g. defining the zone for the domain name 14). In any event, whether the comparative differences between the DNS data 34,34*a* represent signature differences and/or registry data 23 content changes, for example, it is recognized that the DNS data 34,34*a*,34*b* represent different version contents of the DNS data sent to the DNS 30.

An advantage of utilizing the DNS publication service 22 to decidedly (via the signing identifier 110) generate either signed or unsigned DNS data versions (34,34a) or both (i.e. DNS data 34 and DNS data 34a for example) is where a plurality of different registrants 12 use the same DNS publication service 22, such that some of the domain names 14 can be operated as signed domain(s) versions and some can be operated as unsigned domain(s) versions. This distinction between considered signed and unsigned domain versions can be appreciated by the same registrant 12, who may have some domain names 14 operating as signed domains and some domain names 14 operating as unsigned domains. In either case, the same DNS publication service 22, and associated infrastructure of DNS servers 32 (associated with the respective DNS publication service 22), can be utilized by the registrants 12 both for signed and unsigned domains. As such, advantageously, the DNS publication service 22 can be flexibly operated, in parallel, for both for unsigned DNS operation of domains as well as simultaneously for signed DNS operation of domains. It is recognized that for unsigned domains, the DNS data 34 generated by the DNS publication service 22 can consist of only unsigned DNS records 26. In terms of signed domains, the DNS data 34 generated by the DNS publication service 22 will contain at least a portion, if not all, signed DNS records 26.

A further advantage of the DNS publication service 22 is that for the same domain name 14, the registrant 12 can consider to operate the DNS data 34 as the current version of the DNS data and then at the same time validate or otherwise generate the next version DNS data 34a, e.g. by comparing and/or validating the DNS data 34a against the DNS data 34 generated in tandem via the testing facilities 21. As discussed, the need to iteratively test the next DNS data 34a against the current version DNS data 34 (e.g. also referred to as a baseline DNS data 34) can be desirable in view of the potentially ever changing content of the DNS data 34 (e.g. due to the plurality of EPP transactions effected against the registry data 23 during operation of the domain name 14), recognizing that evolution of the registry data 23 of the domain name 14 (during its operation by the registrant 12) could be expected to modify registry data 23 pertinent to the DNS resource records 26 (e.g. selected registry data 23) necessitating a change or update to the DNS data 34 utilized by the DNS 30.

It is also recognized that one example of modified registry data 23 requiring a change in the DNS data 34 would be the registration of a new domain name 14 (e.g. a new domain name 14 create) or transfer of an existing domain name 14 to a new registrant 12 (e.g. a domain name 14 ownership transfer) requested by the registrant 12 (e.g. via the registrar 16). In this manner, the DNS records 26 related to registrant 12 ownership (e.g. domain name server records) could be affected by the registry data 23 creations/modifications in the registry database 18. As such, it is recognized that each transaction (e.g. EPP transaction) performed by the registry operator 20 on registry data 23 contained in the registry database 18, for those registry data affecting DNS records 26—e.g. registry data 23 that is used to populate DNS records 26, would trigger or otherwise instigate the record selection module 200 (see FIG. 3) obtaining the registry data 23 (pertaining to the DNS records 26 of the DNS data 34,34a) and thus facilitating the generation of the different versioned DNS data 34,34a,34b as discussed.

Testing of the next DNS data 34a in the production facilities/servers 21 can be conducted as a comparative test by examining the number of changes we see in the zone data, by comparing the current DNS data 34 with the next DNS data 34a. For example, one could compare DNS data 34 content with DNS data 34a content in order to confirm that the registry side (e.g. registry data) changed 10 records (i.e. DNS data 34a is expected to have 10 different records over that of DNS data 34), so the results of the comparative test between the DNS data 34 and the DNS data 34a would only see/confirm 10 changes plus or minus and signature changes. In other words, if the results of the comparative test were to see 400 changes in this example, then the testing of the next DNS data 34a would fail, as the expected number of changes between the DNS data 34,34a was not confirmed. If the DNS data 34a as a result of the testing (e.g. confirmation of registry data changes) is deemed invalid, then the next DNS data 34a would be discarded and not become the update DNS data 34b. In this case, the next DNS data 34a would be removed from the production facilities/servers 21 in a network path 11d that bypasses both the registry database 18 and the DNS 30. For example, the network path 11d could simply be a deletion of the failed next DNS data 34a from the publication database 19. Alternatively, the network path 11d could simply be a storing of the failed next DNS data 34a in a failed testing database 19a (see FIG. 3).

As an alternative embodiment, for a semantic test of the zone itself (utilizing validating resolvers for example), the production facilities/servers 21 would examine the next DNS data 34a to look/check the signatures of next DNs data 34a are indeed valid for the zone. For example, validating resolvers of the production facilities/servers 21 would work with simulated queries (working the chain of trust from the client side) and check the signatures in terms of working a simulated DNS environment and using their key set). If the DNS data 34a as a result of the validation (e.g. signatures testing) is deemed valid, then the next DNS data 34a would become the update DNS data 34b. If the DNS data 34a as a result of the validation (e.g. signatures testing) is deemed invalid, then the next DNS data 34a would be discarded and not become the update DNS data 34b. In this case, the next DNS data 34a would be removed from the production facilities/servers 21 in a network path 11d that bypasses both the registry database 18 and the DNS 30. For example, the network path 11d could simply be a deletion of the failed next DNS data 34a from the publication database 19. Alternatively, the network path 11d could simply be a storing of the failed next DNS data 34a in a failed testing database 19a (see FIG. 3).

For example, the DNS publication service 22 could have an identifier table 38 (stored in a publication database 19 as including the generation instructions 105, 105a), providing the signing identifier 110 (e.g. signed or unsigned) as well as the publication identifier 39 (e.g. for publication or publication restriction for a particular DNS data set 34,34a) associated with each of the domain names 14. Further, it is recognized that the DNS publication service 22 is responsible for receiving the registry data 23 (e.g. selected data pertinent to the DNS records 26) of the domain name 14 (e.g. as obtained from the domain name registry 18 database) and then using the obtained registry data 23 to generate the DNS data 34,34b. The current/updated version DNS data 34,34b can then be transmitted directly to the DNS 30 (i.e. published to the DNS servers 32) in the network transmission path 11a that bypasses the domain name registry 18 database. In other words, the generated current version DNS data 34,34b is not returned/stored to/in the domain name registry 18 database once generated, rather the generated current/updated version DNS data 34,34b is sent by the DNS publication service 22 directly over the network path 11a to the plurality of DNS servers 32 associated with the domain name 14 (e.g. as administered by the DNS publication service 22). Therefore, it is recognized that each time that new/modified live version DNS data 34,34b is to be generated, the associated registry data 23 (e.g. RD1, RD2, etc.) is obtained by the DNS publication service 22 for use in generating and then transmitting of the resultant version DNS data 34,34b over the transmission path 11a. Further, the next version DNS data set 34a designated as "publication restriction" (e.g. by the publication identifier 39 during testing/validating) is stored in the publication storage 19 (i.e. not in the domain name registry 18 database) for operational testing (e.g. not accessible by the users 12 over the network 11) of the domain using the stored, e.g. next version, DNS data set 34a. Meanwhile, the transmitted current/updated version DNS data set 34,34b designated as "publication" is used by the DNS servers 32 in order to operate the domain (of the domain name 14) for network 11 access by the users 12 (e.g. to gain access to the network resources 31 using the DNS services provided by the DNS servers 32 of the DNS 30).

In this manner, the registrant 12 can continue to operate live their domain name 14 using the current/updated version (e.g. first) DNS data 34,34b (via the DNS servers 32) while simultaneous testing is performed on their domain name 14 using the next version (e.g. second) DNS data 34a (via production facilities/servers 21 requesting and obtaining the test version DNS data 34a) in interacting with the stored DNS data 34a of the publication storage 19. For example, the production facilities 21 can use the stored test version DNS data 34a to replicate selected DNS operations implemented (as shared with the production facilities 21 by the DNS 30 and/or the registry operator 20 by example) with respect to the live domain name registry 18 database and/or the live DNS 30 using the published DNS data 34,34b. It is also recognized that the production facilities/servers 21 have available access to both the current/updated published version DNS data 34,34b and the next/test version DNS data 34a, such that the next/test version DNS data 34a can be compared and/or otherwise validated with respect to the live current/updated version DNS data 34,34b as published to the DNS 30.

For example, the DNS publication service 22 could have the identifier table 38 (stored in a publication database 19), providing the signing identifier 110 (e.g. signed or unsigned) associated with each of the domain names 14 (and the record types 26c of the domain names 14). Further, it is recognized that the DNS publication service 22 is responsible for receiving the registry data 23 of the domain name 14 (e.g. as obtained from the domain name registry 18 database) and then using the obtained registry data 23 to generate the resource record(s) 26 of the DNS data 34. The DNS data 34 can then be transmitted directly to the DNS 30 (i.e. published to the DNS servers 32) in the network transmission path 11a that bypasses the domain name registry 18 database. In other words, the generated DNS data 34 is not returned to or otherwise stored in the domain name registry 18 database, once generated. Rather, the generated DNS data 34 is sent by the DNS publication service 22 directly over the network path 11a to the plurality of DNS servers 32 associated with the domain name 14 (e.g. as administered by the DNS publication service 22). Therefore, it is recognized that each time that new DNS data 34 is to be generated, the associated registry data 23 (pertaining to the resource record(s) 26) is obtained by the DNS publication service 22 for use in generating and then transmitting of the resultant DNS data 34 over the transmission path 11a.

Accordingly, as noted herein, the generated resource records 26 and resultant DNS data 34 are not stored in the registry database 18, rather the DNS data 34 (containing the signed/unsigned resource records 26 for use in implementing the current operation of the DNS 30) is published directly to the DNS 30 using the transmission path 11a, while the test version DNS data 34a is stored directly in the publication storage 19 in a transmission path 11b that also preferably bypasses the registry database 18. In other words, preferably, the publication database 19 is separate from the registry database 18, such that that the publication storage 19 (containing the test version DNS data 34a) is not accessible by the resolver servers 35. Further, it is recognized that the DNS servers 32 of the DNS 30 do not have access (are inhibited) to the stored test version DNS data 34a, such that the test version DNS data 34a is not used to implement access to the network resources 31 by the DNS 30 (working in tandem with the resolver servers 35 operating in conjunction with the computing network devices of the users 12,13.

The registry data 23 (pertinent to the resource records 26) can be obtained synchronously or asynchronously (as a DNS request 23a) from a registry data source (e.g. a registry data client—i.e. a client of the server implementing the DNS publication service 22). The registry data client (of the DNS publication service 22) can be provided as the registrar 16, the registry operator 20, and/or the registry database 18 itself (e.g. via a registry server 18a managing transfer of registry data 23 into/out of the registry database 18 itself). It is important to note that the registry data client (e.g. network entity 16, 18, 20) only provides/sends the registry data 23 to the DNS publication service 22. Importantly, the registry data client (from which the registry data 23 was obtained) does not receive the resultant live version DNS data 34 intended for receipt by the DNS 30 (as generated by the DNS publication service 22). Rather, preferably, the generated DNS data 34 (intended for current use by the DNS 30) is published to the DNS 30 in the network transmission path 11a that bypasses the registry data client. In other words, the generated DNS data 34 (as a response to the receipt of the registry data 23 in the form of a synchronous or asynchronous DNS request 23a from the registry data client) is not returned to the registry data client. As discussed, in general, any live version DNS data 34 transmitted/published to the DNS 30 is intended to facilitate interaction between the resolver servers 35 and the DNS servers 32. On the contrary, as discussed, in general, any test version DNS data 34a transmitted to the publication storage 19 is not intended (i.e. inhibited) to facilitate any live interaction between the resolver servers 35 and the DNS servers 32.

It is recognized that an appropriate response to the received DNS request 23a (e.g. a response from the DNS publication service 22 to the registry data client) can be, for example; an acknowledgement of receipt the DNS request 23a, a confirmation of generation/publication of the DNS data 34, a null response, or any other form of response other than transmission of the generated DNS data 34 for purposes of storing in the registry database 18. In other words, the registry data client does not expect to receive the generated live DNS data 34 intended for publication in the DNS 30, in response to the provision of the registry data 23 in the form of the DNS request 23a. It is recognized that the DNS request 23a can be a result of one or more changes (e.g. create/modify/delete) in the registry data 23 that is pertinent to the data contained in the resource records 26 of the DNS 30 (as implemented by the DNS servers 32). These changes in the registry data 23 can be the result of the EPP transaction(s) received (and processed) by the registry operator 20 from a respective registrant 12 and/or registrar 16 for one or more domain name(s) 14 associated with the registry data 23. Another cause for receipt of the DNS request 23a by the DNS publication service 22 could be TTL requirements of the DNS data 34 (e.g. due to upcoming expiration of the current DNS data 34 held in the DNS 30). In any event, the generated DNS data 34 for current use in the DNS 30 is not stored in the registry database 18.

Domain Names 14

In general, the domain names 14 can be setup or otherwise maintained/renewed for a domain name registrant 12 (e.g. domain owner) via a domain name registrar 16 for one or more domain names 14 available (e.g. not yet claimed) or otherwise owned in a domain name registry 18 (e.g. a database of all domain names registered in a top-level domain (TLD)). The domain name registry 18 can be managed by a registry operator 20 (or the registry services provider 22) that also generates zones (e.g. represented by the relevant zone data) which represent a lookup of the domain names 14 to IP addresses, for example as performed by the DNS servers 32 using the DNS data 34 published by the publication system 10. As further described below, the DNS data 34 are based on resource records 26 (e.g. Name Server name/address records, Delegation Signer records, etc.) associated with the registry data 23 of particular domain name(s) 14. It is recognized that DNSSEC related resource records 26 are not stored in the registry database 18, as these are generated on the fly by the DNS publication service 22 using the generation instructions 105,105*a* (see FIG. 3) associated with the domain names 14. It is also recognized that the DNS data 34 can include other data specific to the DNS zone itself (e.g. the zone apex).

A zone data, e.g. the DNS data 34 of a domain name 14, is representative of a text file that describes a portion of the DNS called a DNS zone, including the owner of the record. A zone data (e.g. the DNS data 34) is organized in the form of resource records (RR) 26 and contains information that defines mappings between domain names 14 and IP addresses and other resources 31, as based upon registry data 23. For example, the DNS data 34 contains the DNS records 26 in wire transfer format, as implemented in the DNS 30. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), the type 26*c* of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

Within the DNS publication system 10, the registry operator 20 can interact with the registry service provider 22 (aka DNS publication service 22), in order to facilitate registrants 12 responsible for generating and maintaining web pages 31 (e.g. network resources 31 that can be hosted by the registrants 12) associated with domain name 14. It is recognized that registrant 12 itself can communicate directly with registry service provider 22 for providing the registry data 23 used in generation of the DNS data 34, and/or can have the registry data 23 communicated to the registry service provider 22 (e.g. DNS publication service 22) via the registry operator 20 and/or the registrar 16. As such, once the DNS data 34 is published on the DNS 30, network 11 users can access network resources 31 via the network 11 and accordingly access content/services provided by the network resources 31 (e.g. web pages, web services, email services, etc.). An example of such access is the network 11 users 13 using a web browser to navigate on the network 11 to web pages 31 and displaying of web content 31 on a user interface of the user's 13 computer device 100 (see FIG. 5). It is recognized that the network 11 address (i.e. IP address) of the various network resources 31 are obtained by the users 13 via the DNS data 34 implemented by the DNS servers 32, as further described below.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that domain name registrar 16, registry operator 20 and DNS publication service 22 can be implemented on the computer devices 100 (see FIG. 5) such as servers and can communicate with one another via the network 11 in client-server relationships.

In general, a domain name 14 is an identification string that defines a realm of administrative autonomy, authority, or control on the Internet 11, whereby domain names 14 are formed by the rules and procedures of the DNS 30. Domain names 14 are used in various networking contexts and application-specific naming and addressing purposes, as an Internet Protocol (IP) resource 31, such as a personal computer used to access the Internet 11, a server computer 33 hosting a web site 31, or the web site 31 itself or any other service 31 communicated via the Internet 11. Domain names 14 are organized in subordinate levels (subdomains) of the DNS root domain, which is referred to as the root zone, and is represented as a single dot ("."). The first-level set of domain names 14 are the TLDs. Below these TLDs in the DNS 30 hierarchy are the second-level and third-level domain names 14 that are typically open for reservation by end-users who wish to connect local area networks to the Internet 11, create other publicly accessible Internet resources 31 or run web sites 31. There can be fourth- and fifth-level domains, and so on, with virtually no limitation. The registration of these domain names 14 is usually administered by domain name registrars 16 who sell their services to the public (i.e. registrants 12). Individual Internet host computers can use domain names 14 as host identifiers, or hostnames. Hostnames can be defined as the leaf labels in the domain name system usually without further subordinate domain name space and can appear as a component in Uniform Resource Locators (URLs) for Internet resources 31 such as web sites 31 having one or more web pages 31. Domain names 14 can also be used as simple identification labels to indicate ownership or control of a resource 31, such as realm identifiers used in the Session Initiation Protocol (SIP), DomainKeys used to verify DNS domains in e-mail systems 31, and in many other Uniform Resource Identifiers (URIs). For example, the domain name 14 can be a component of a (URL) used to access web sites 31, for example: URL—http://www.example.info/index.html, Top-level domain name: info, Second-level domain name: example.info, Host name: www.example.info.

Domain name 14 can consist of one or more parts, technically called labels, which are conventionally concatenated, and delimited by dots, such as example.info. Not that the rightmost dot, representing the root zone, is many times omitted in the vernacular—it should be implied if not specified (e.g. for the domain name expressed as "example.info", the Fully Qualified Domain Name would be "example.info."). The rightmost label conveys the TLD, for example, the domain name www.example.info falls under to the TLD info. The hierarchy of domains descends from the right to the left label (or from left to right depending upon language considerations) in the name; each label to the left specifies a subdivision, or subdomain of the domain to the right. For example: the label example specifies a node example.info as a subdomain of the info domain, and www is a label to create www.example.info, (e.g. a subdomain or otherwise an element of the current domain) of example.info. A hostname is a domain name 14 that has at least one associated IP address. For example, the domain names www.example.info and example.info may also be hostnames, whereas the info domain is not. However, other TLDs may indeed have an IP address, and if so, they are also hostnames. It is recognized that hostnames can impose restrictions on the characters allowed in the corresponding domain name 14. A valid hostname is also a valid domain name 14, but a valid domain name 14 may not necessarily be valid as a hostname.

Referring again to FIG. 1, the domain name registry 18 can contain those domain names 14 that are registered for a specific TLD, which is one of the domains immediately under the highest level in the hierarchical Domain Name System (DNS) 30 of the Internet 11. Practically speaking, TLD names 14 are installed in the root zone of the name space for the TLD and for all domains in lower levels, the TLD is the last part of the domain name 14, that is, the last label of a fully qualified domain name, with the trailing dot for the root zone designation. It is recognized that there can be a number of different TLD types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System 30; generic top-level domains (gTLD) which are top-level domains with three or more characters (e.g. GOV, EDU, COM, MIL, ORG, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD; and infrastructure top-level domain that is one domain, the Address and Routing Parameter Area (ARPA) managed on behalf of the Internet Engineering Task Force for various purposes specified in the Request for Comments publications.

Domain names 14 can be formed from the set of alphanumeric ASCII characters (a-z, A-Z, 0-9), but characters are case-insensitive. In addition, the hyphen can be permitted if it is surrounded by a characters or digits, i.e. it is not the start or end of a label. Labels are separated by the full stop (period) character in the textual name representation, and are limited to 63 characters in length. It is recognized that the domain names 14 can be represented using characters based in other languages as well, including alternate formats as appropriate, as desired.

Referring to FIG. 1, shown are network resources 31, which are accessible via a specified URI (over the network 11) of the server 33 incorporating the domain name 14 associated with the specified TLD maintained in domain name registry 18, using an appropriate network communications protocol (e.g. SMTP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the Internet) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

DNS Publication Service 22

Figure 3:
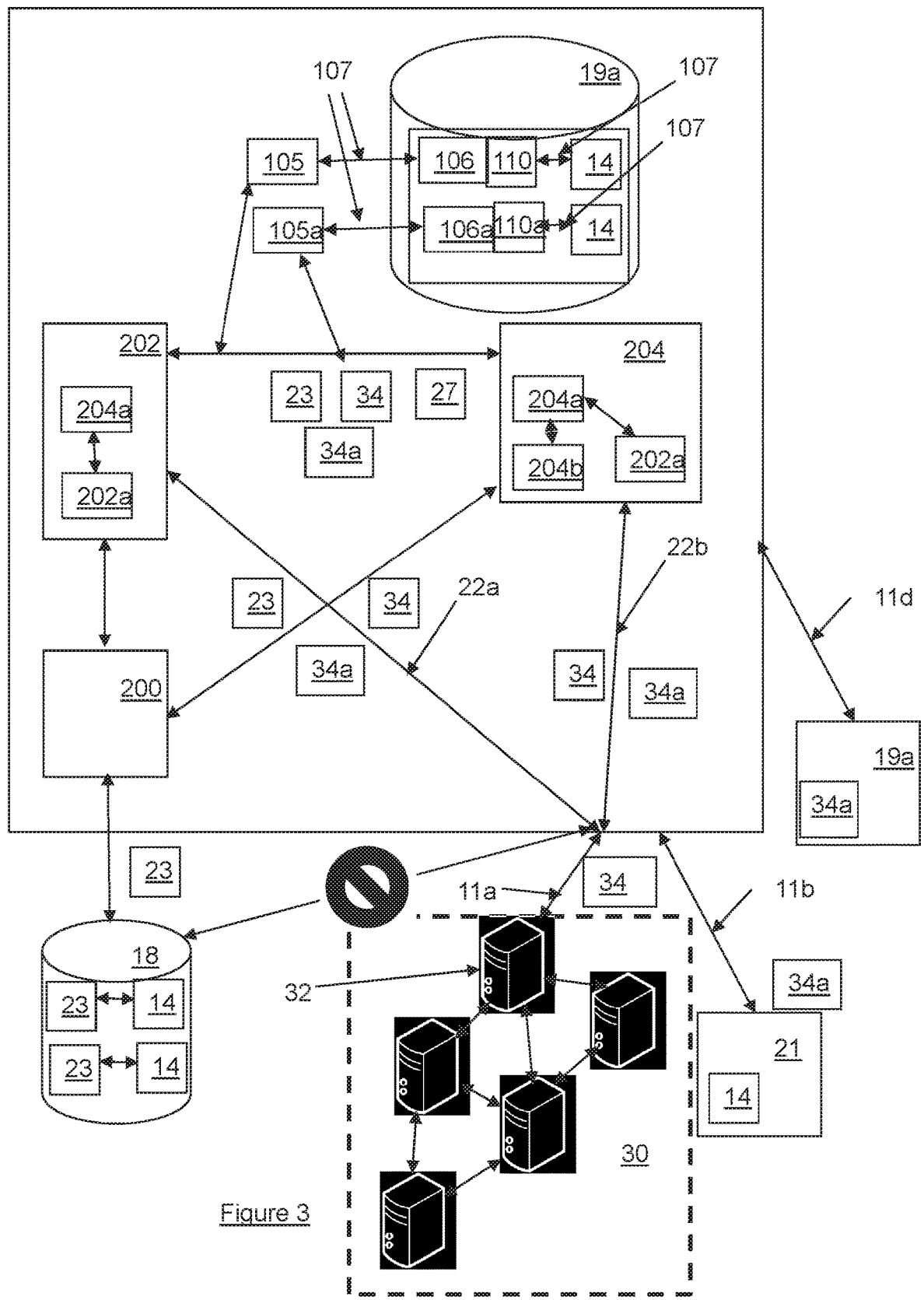
FIG. 3 is an example configuration of a DNS publication service for generating the DNS data of FIG. 2.

Referring to FIG. 1-3, shown is a block diagram of the DNS publication service 22. The DNS publication service 22 has a plurality of components 200, 202, 204, e.g. configured as logical/software and/or hardware components for acting alone or in combination, for obtaining/receiving the registry data 23 from the registry database 18, for generating the live version DNS data 34 according to a set of generation instructions 105 and for transmitting the generated DNS data 34 to the DNS servers 32 of the DNS 30. Also, the DNS publication service 22 has a plurality of components 200, 202, 204, e.g. configured as logical/software and/or hardware components for acting alone or in combination, for obtaining/receiving the registry data 23 from the registry database 18, for generating the test version DNS data 34*a* according to a set of generation instructions 105*a* and for transmitting the generated DNS data 34*a* to the publication storage 19, as accessible by the testing facilities 21. For example, the components 200, 202, 204 could each be implemented as a set of instructions stored in a storage and executing on a computer processor (e.g. a server) in order to perform their respective functions (e.g. processing) on the registry data 23 and/or the DNS records 26. Alternatively, the components 200, 202, 204 could each be implemented as a hardware (e.g. a solid state device) having storage and one or more computer processors in order to perform their respective functions (e.g. processing) on the registry data 23 and/or the DNS records 26. Alternatively, the components 200, 202, 204 could each be implemented as a combination of a set of instructions stored in a storage and executing on a computer processor and a hardware (e.g. a solid state device) having storage and one or more computer processors in order to perform their respective functions (e.g. processing) on the registry data 23 and/or the DNS records 26.

Examples of the components could be a record selection module 200, a distribution system 202 and a signing system 204, further described below. It is recognized that the generation instructions 105,105*a* can include instructions (hosted/shared by one or more of the components 200, 202, 204) pertaining to the manner in which DNSSEC (and also include related DNSSEC records 106, 106*a* stored in a DNSSEC storage 19*a*) is implemented or not with respect 107 to particular one or more domain name(s) 14 (e.g. domains, subdomains, etc. as part of a defined zone) having the resource records 26 (see FIG. 3). In one embodiment, the generation instructions 105, 105*a* the DNSSEC records 106, 106*a* and signing identifiers 110, 110*a* and publication identifiers 39, 39*a* can be stored in the table 38 (see FIG. 1), such that each of the domain names 14 are assigned respective generation instructions 105, 105*a*, DNSSEC records 106, 106*a* and/or signing identifiers 110, 110*a* and/or publication identifiers 39, 39a in the table 38. As such, the DNS publication service 22 consults (or is otherwise configured) by the generation instructions 105, 105a, DNSSEC records 106, 106a and/or signing identifiers 110, 110a and/or publication identifiers 39, 39a when the DNS data 34,34a is generated for the respective domain name(s) 14.

It is recognized that the DNSSEC records 106,106a can be provisioned 107 for the respective domain name(s) 14 as part of the setup of the domain name(s) 14, in order to specify whether the domain name(s) 14 are to be "signed" or "unsigned" (e.g. for specified record type(s) 26c) as it pertains to the DNS data 34,34a generated by the DNS publication service 22. For example, the DNSSEC records 106,106a of the generating instructions 105,105a could define particular record fields, permitted values, etc. used to contain generated signatures obtained from the signature module 204b (see FIG. 3) by the record generation module 204a (which would then use the definitions of the DNSSEC records 106,106a to generate instances thereof with the obtained signature data from the signature module 204b).

The provisioning 107 can include definitions of respective signing key records for the zone apex of the domain name 14 (e.g. the domain as compared to the subdomains). The provisioning 107 can be considered as generating metadata (e.g. configuration parameters for a set of DNSSEC signing keys as well as designating which of the record types 26c are to be signed or unsigned) for the zone with respect to how the DNS data 34,34a should be generated for the domains and subdomains of the domain name 14. For example, the generation instructions can include one or more signing identifiers 110,110a (e.g. the presence or absence of RRSIG record(s) 26a incorporated as part of the DNSSEC records 106,106a to be included in the DNS data 34,34a upon generation thereof).

For example, one embodiment of the signing identifier(s) 110,100a in the generation instructions 105, 105a could be instructions for the RR set 26d (for a particular record type 26c), i.e. to include the RRSIG record 26a, recognizing that the RRSIG record 26a signifies the particular record type 26c be signed during generation of the DNS data 34a for that particular record type 26c by the signing system 204. It is recognized that for an unsigned zone, e.g. the entire zone, all of the resource records 26 (e.g. all of the record types 26c) would be designated as unsigned (e.g. definition of key sets would be absent or otherwise null in the generation instructions 105, 105a). As an example of record types 26c for signing or not, for a signed zone (i.e. the provisioning 107 includes definition of a resource record key set): an A record type 26c is designated in the generation instructions 105, 105a as signed for use by respective authoritative servers 32 of the DNS 30; the Delegation Signer (DS) record type 26c is designated in the generation instructions 105, 105a as always signed; and Name Server (NS) record type 26c is designated in the generation instructions 105,105a as unsigned.

Another embodiment of the signing identifier 110 is an indication of record (type 26c) signed or record (type 26c) unsigned for each pertinent domain/subdomain for a particular zone (for the associated domain name 14). As such, one or more of the components 200, 202, 204 would have access to the signing identifier(s) 110, 110a (e.g. in the generating instructions 105,105a) in order to guide the generation of the DNS data 34, 34a for selected registry data 23 (as obtained from the registry database 18). For a considered signed domain name 14, it is recognized that the individual RR sets 26d (of the RR transfer set 34,34a—see FIG. 2) can contain signed records, as dictated by the generation instructions 105, 105a and associated DNSSEC records 106 (or not) and the signing identifier(s) 110, 110a. For a considered signed domain name 14, it is recognized that the individual RR sets 26d (of the RR transfer set 34, 34a—see FIG. 2) can contain both signed records and unsigned records, as dictated by the generation instructions 105, 105a and associated DNSSEC records 106,106a (or not) and the signing identifier(s) 110, 110a. For a considered unsigned domain name 14, it is recognized that the individual RR sets 26d (of the RR transfer set 34, 34a—see FIG. 2) can contain unsigned records, as dictated by the generation instructions 105, 105a and associated DNSSEC records 106,106a (or not) and the signing identifier(s) 110, 110a.

Publication Switching of DNS Data 34,34a

As such, it is recognized that the live version DNS data 34 can be considered the unsigned domain and the test version DNS data 34a can be considered the signed domain. Alternatively, the live version DNS data 34 can be considered the signed domain and the test version DNS data 34a can be considered the unsigned domain.

As such, in order to change particular domain name(s) 14 from signed to unsigned or from unsigned to signed, for example, the provisioning 107 (defining of the generation instructions 105,105a and related DNSSEC records 106, 106a and signing identifier(s) 110,110a) would be amended (e.g. by an administrator of the DNS publication service 22 upon request of the registrant 12 and/or registrar 16) to reflect such the change (e.g. between signed and unsigned), in order for the DNS publication service 22 to subsequently generate (post change in the provisioning 107) the appropriate DNS data 34,34a that is published to the DNS 30. For example, part of the provisioning 107 step for the particular domain name(s) 14 would be the administrator defining/ configuring the generation instructions 105,105a (and applicable DNSSEC records 106,106a and identifier(s) 110,110a) for each of the relevant record types 26c of the relevant domain name(s) 14 prior to subsequent generation of the DNS data 34,34a by the DNS publication service 22.

For example, the provisioning 107 by the administrator could designate/assign the set of generation instructions 105a to the generation of the test version DNS data 34a and designate/assign the set of generation instructions 105 to the generation of the live version DNS data 34, in the case where the DNS data 34,34a content is dissimilar by having differences in record types. Alternatively, the provisioning 107 by the administrator could designate/assign the set of generation instructions 105 to the generation of the test version DNS data 34 and designate/assign the same set of generation instructions 105 to the generation of the next version DNS data 34a (e.g. in the case where both the signature content and the record types remain the same between the two DNS data 34,34a, such that any difference in DNS data content could be related to differences in number of instances of the same record types). It is also recognized that as part of the generation instructions 105,105a, the publication identifiers 39,39a could also be provisioned 107 by the system administrator.

For example, the next DNS data 34a could be intended for testing (i.e. transmitted on the path 11b to the publication storage 19), the publication identifier 39a would be designated as "not publish", "inhibit publish" or otherwise "intended for testing", "send to test", "divert from DNS", thus instructing the publication module 202a to send the deemed next version DNS data 34a directly to the publication storage 19 once generated. In a further embodiment, for example, if the next DNS data 34a was intended for publication (i.e. transmitted on the path 11a to the DNS 30 and thus in effect bypassing the publication storage 19 for testing/validating), the publication identifier 39a would be designated as "publish", thus instructing the publication module 202a to send the next DNS data 34a directly to the DNS 30 once generated, as the update DNS data 34b.

One example of the publication identifiers 39,39a (e.g. a publication mechanism) would be an enabled pointer to the publication module 202a (or a lack of a pointer or otherwise a disabled pointer) in the generation instructions 105, 105a. For example, if the pointer (e.g. publication identifier 39a) for the DNS data 34a was enabled, then once the generation of the DNS data 34a is completed the pointer 39a would direct the record generation module 204a (see FIG. 3) to send the generated DNS data 34a to the publication module 202a. In this example, the pointer 39a is consulted by the record generation module 204a. The role of the publication module 202a (as configured by the provisioning 107, for example) would be to publish to the DNS 30 any DNS data 34a received by the publication module 202a, with predefined knowledge (e.g. stored publication/transmission instructions) of which network 11 address(es) (of one or more of the DNS servers 32) for the respective domain name 14 the DNS data 34 should be sent/transmitted to (on the network path 11a).

As such, once the publication module 202a receives the generated DNS data 34a (for a specified domain name 14), the role of the publication module 202a is to consult the defined network 11 address(es) (of the DNS server(s)) and thus send the generated DNS data 34a to the DNS 30 in the network path 11a that bypasses the registry database 18. In this example, the generated next version DNS data 34a is associated with the pointer 39a (e.g. "enable publication" identifier 39a) to the DNS 30 (i.e. effectively designating the DNS data 34a as the next live/current version—e.g. the update DNS data 34b). On the contrary, the generated test version DNS data 34a would not have a defined pointer to the DNS 30, thus inhibiting any publication of the test version DNS data 34a to the DNS 30. Instead, the test version DNS data 34a would have an "inhibit publication" pointer 39a (e.g. "enable publication" identifier 39) associated therewith, such that the inhibit publication pointer 39a would direct the record generation module 204a to direct the generated next version of the DNS data 34a to the publication storage 19 rather than to than to the DNS 30, in the path 11b that bypasses the DNS 30 (and preferably the registry database 18 as well). In this embodiment, it is recognized that the record generation module 204a consults the inhibit publication identifier 39a and acts accordingly.

A further example of the publication identifiers 39,39a (e.g. a publication mechanism) could be a specific publication flag associated with a particular set of DNS data 34,34a, e.g. as defined in the generation instructions 105,105a, such that consultation of the publication identifiers 39,39a (e.g. having either an enable publication identifier or inhibit publication value) by the publication module 202a and/or the record generation module 204a would provide instructions as to which location (either the DNS 30 via path 11a or the publication storage 19 via path 11b) the generated DNS data 34,34a should be sent/transmitted. In any event, it is recognized that one or more modules of the component 202 (e.g. including the component 200) and/or of the component 204 would consult the publication identifiers 39,39a (e.g. as publication pointers and/or as publication flags). It is also recognized that the publication identifiers 39,39a can use the described publication mechanism embodiments, or other publication mechanism embodiments as desired. Further, it is recognized that the publication identifiers 39,39a can both be the same publication mechanism (e.g. both publication flags) or different publication mechanisms (e.g. one as a publication flag and the other as the publication pointer).

In terms of changing from the current DNS data 34 to the update DNS data 34b, in order to enable testing/validation of the next version DNS data 34a to completion, the administrator could: (1) instruct the DNS publication service 22 (e.g. distribution system 202) to stop publication of the next version DNS data 34a to the DNS 30 (e.g. disable the publication module 202a (or the signing module 204b for that matter depending upon the embodiment used to publish or not publish the DNS data) for example by disabling/deleting the publication identifier 39a and/or any information concerning the network address(es) of the DNS 30); (2) then provision 107 the domain by essentially switching the generation instructions 105,105a (e.g. pointing from the instructions 105 to the instructions 105a for the next version DNS data 34a by designating the publication identifier 39a as "not/inhibit publish") and any other DNS related instructions/records (106 to 106a)/identifiers (110 to 110a) to include respective generated keys with respect to the apex of the domain; and (3) once testing/validating is confirmed would then instruct the DNS publication service 22 (e.g. the publication module 202a or signing module 204b for that matter depending upon the embodiment used to publish or not publish the DNS data) to resume publication but now designating the now considered next version DNS data 34a (i.e. replacing the previously current DNS data 34 with the new updated version DNS data 34b).

It is considered that designation of the specific generating instructions 105,105a (to be used) to generate a selected version of the DNS data 34,34a could also be considered as a configuration embodiment of the publication identifiers 39,39a. For example, in deciding to change from the DNS data 34 (sent to the DNS 30) to the DNS data 34a (sent to the DNS 30), the administrator could simply switch the generation instructions 105 to the generation instructions 105a (incorporating the DNSSEC records 106 to 106a and the signing identifiers 110 to 110a). Thus, any newly generated (and tested/validated) update DNS data 34b would be performed by the publication/signing component(s) using the generation instructions 105a, in effect changing the current version DNS data 34 to the new update version DNS data 34b (once testing/validation thereof is confirmed/satisfied).

Figure 7:
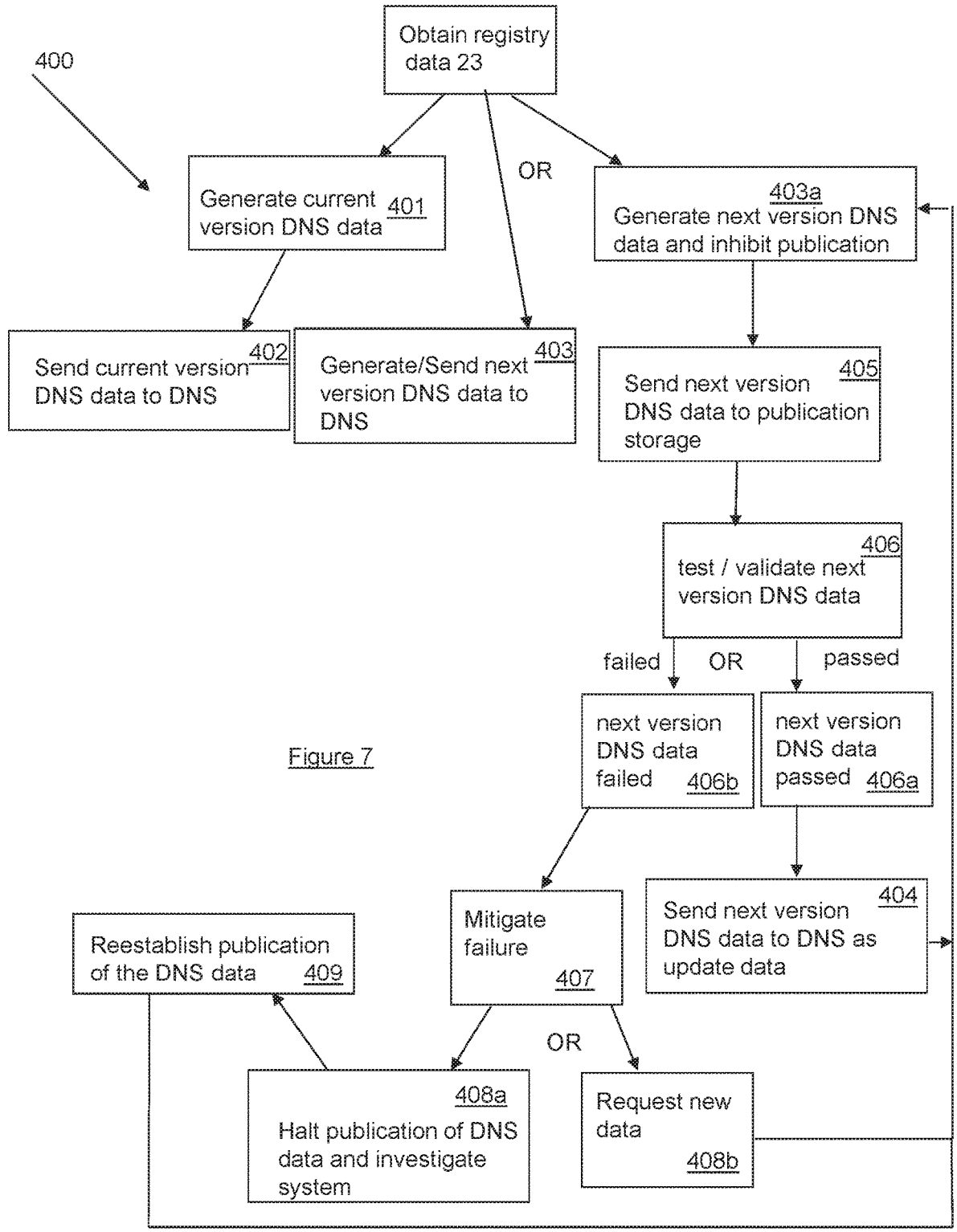
FIG. 7 is an example operation of the publication switching of the DNS data of the system of FIG. 3.

Referring to FIG. 7, shown is a diagrammatic method 400 of publication of the DNS records 26 to the DNS 30 (e.g. previously sent DNS data 34 is updated 404 to the now ready update version DNS data 34b). In this manner, via the publication system 22: one can operate 402 the domain name 14 using a current version DNS data 34 by previously sending 401 to the DNS 30; as well as concurrently generate 403a and send 405 to publication storage and test/validate 406 the next version DNS data 34a. Alternatively, the next DNS data can be sent 403 directly to the DNS 30, thereby bypassing the testing/validation facilities 21.

If sent for testing/validation, the next DNS data 34a would either pass 406a or fail 406b the testing/validation. If passed, the next DNS data 34a would become the resultant update DNS data 34b and would be sent 404 to the DNS 30. Subsequent next version DNS data 34a would be generated at step 403,403a.

Alternatively, if failed, the publication system 22 would be employed at step 407 to mitigate or otherwise deal with the failure. For example, at step 407 the failed next DNS data 34a would simply be stored in the failed testing storage 19a or otherwise deleted. Alternatively, the system 22 could request 408b new/replacement data 23 from the registry database 18 and then start again at step 403a with an effort to result in a successful testing/validation at step 406a. Alternatively, the system 408b could request 408b that the signing system 204 resign the original DNS data 34a in an attempt to correct the failed testing/validation by continuing at step 403a (with efforts to result in a successful testing/validation at step 406a). Alternatively, in the event it is deemed a systemic failure of the publication system 22, then at step 407 it could be decided that the publication system 22 be halted 408a and the system 22 investigated for any systemic/fundamental defects. Once corrected, regular operation of the publication system 22 could reestablished at step 409 and the next DNS data 34 generated at step 403a, for example.

Other DNSSEC records 106,106a stored in the DNSSEC storage 19a can include records such as but not limited to: DNS Public Key (DNSKEY); and Delegation Signer (DS). In any event, it is recognized that the DNSSEC records 106,106a are not stored in the registry storage 18 along with the other registry data 23 pertaining to the domain name(s) 14, rather the DNSSEC records 106,106a are stored in the DNSSEC storage 19a as made available to the DNS publication service 22. It is further recognized that the generated DNS data 34,34a including (or not) any DNSSEC related data (e.g. values of the RRSIG record 26a, etc.), is also not stored in the registry database 18 subsequent to generation of the DNS data 34,34a. Rather, the current/update version DNS data 34,34b once generated (and subjected to testing/validation if selected via the configured publication identifier 39,39a to not by pass the publication storage 19) by the DNS publication service 22, is transmitted directly to the DNS servers 32 of the DNS 30 in a network path 11a (see FIG. 1) that bypasses the registry database 18.

Generation of Live Version DNS Data 34,34a for Transmission to the DNS 30

Referring again to FIG. 3, there are considered a number of different operational embodiments of the DNS publication service 22. It is recognized that each of the operational embodiments for each respective component 200,202,204 could also be compatible with the other operational embodiments for each of the other respective components 200,202, 204. It is envisioned that the particular DNS data 34,34a (e.g. provisioned as signed or unsigned for the DNS 30) can be generated and published (e.g. to the DNS 30) as described. In this regard, the particular DNS data 34,34a is being generated as the current version DNS data 34,34a and published (i.e. to the DNS 30) as such. It is recognized that the next version DNS data 34a and the current version DNS data 34 are being generated concurrently by the DNS publication service 22, such that the current version DNS data 34 is sent to the DNS 30 and the next version DNS data 34a can be sent to the publication storage 19 for testing/validation.

Concerning the obtaining/receipt of the registry data 23 via the record selection module 200. In one embodiment A for the component 200, the registry data 23 (pertaining to the record types 26c of the DNS data 34) could be pushed to the record selection module 200 by the registry operator 20 (as collected from the registry database 18), upon the registry operator 20 processing a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or for existing domain name(s) 14. In a further embodiment B for the component 200, the registry data 23 (pertaining to the record types 26c of the DNS data 34) could be pulled by the record selection module 200 from the registry operator 20 (as collected from the registry database 18), upon monitoring and detecting by the record selection module 200 that the registry operator 20 processed a registry transaction 110 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or existing domain name(s) 14. It is recognized that any/all of the functionality of the record selection module 200 and the distribution system 202 can be combined in one system/module as desired, or can be separated as described by example only.

Concerning generation of DNS data 34 as unsigned by the distribution system 202 (i.e. component 202), utilizing the registry data 23 as provided by the record selection module 200 (i.e. those registry data 23 obtained/received from the registry database 18). In one embodiment A for the component 202, the distribution system 202 would (1) receive the registry data 23, (2) would consult the generation instructions 105 (and associated signing identifier(s) 110) in order to identify that the corresponding resource records 26 are to remain unsigned (e.g. the signing identifier(s) 110 indicate that the record type(s) 26c are to be unsigned), (3) would generate the DNS data 34 using the generation instructions 105 and the registry data 23, and (4) would send the DNS data 34 in transmission paths 11a,22a to the DNS 30 that bypass the signing system 204 as well as the registry database 18. One advantage to this embodiment A for component 202 is that the signing system 204 computing resources (e.g. receiving/processing resource records 26 that ultimately are not signed) are not utilized needlessly for those resource record(s) 26 that are identified by the signing identifier(s) 110 as unsigned.

In a further embodiment B for the component 202, the distribution system 202 would (1) receive the registry data 23, (2) would optionally consult the generation instructions 105 (and/or associated signing identifier(s) 110) in order to identify that the resource records 26 pertaining to the registry data 23 are to remain unsigned (e.g. the signing identifier(s) 110 indicate that the record type(s) 26c are to be unsigned), and (3) would send the DNS data 34 in a transmission path 11a to the DNS 30 that bypasses the registry database 18. In this embodiment B for the component 202, the signing system is used to generate the DNS data 34. One advantage to this embodiment B for component 202 is that signing system 204 computing resources (e.g. for publishing the DNS data 34) are not utilized needlessly.

In a further embodiment C for the component 202, the distribution system 202 would (1) receive the registry data 23, (2) would optionally consult the generation instructions 105 (and/or associated signing identifier(s) 110) in order to identify that the resource records 26 pertaining to the registry data 23 are to remain unsigned (e.g. the signing identifier(s) 110 indicate that the record type(s) 26c are to be unsigned), (3) would send the registry data 23 to the signing system 204 in order for the signing system 204 to generate the DNS data 34 using the generation instructions 105, and (4) the signing system 204 would send the DNS data 34 in transmission paths 22b,11a to the DNS 30 that bypass the registry database 18 and the distribution system 202. In this embodiment C for the component 202, the signing system is used to generate the DNS data 34 as well as to publish the generated DNS data 34. One advantage to this embodiment C for component 202 is that the distribution system 202 computing resources (e.g. for publishing the DNS data 34) are not utilized needlessly.

Concerning generation of DNS data 34 as containing both unsigned and signed (by the signing component 204), utilizing the registry data 23 as provided by the record selection module 200 and/or the distribution system 202 (i.e. those registry data 23 obtained/received from the registry database 18). In one embodiment A for the component 204, the signing system 204 would (1) receive the registry data 23 from the component 200,202, (2) would consult the generation instructions 105 (and associated signing identifier(s) 110) in order to identify which of the corresponding resource records 26 are to be signed (e.g. the signing identifier(s) 110 indicate that the record type(s) 26c are to be signed—as well as if relevant where any of the record type(s) 26c are to remain unsigned), (3) would generate the DNS data 34 using the generation instructions 105, and (4) would send the DNS data 34 in transmission paths 11a,22b to the DNS 30 that bypass the distribution system 202 as well as the registry database 18. One advantage to this embodiment A for component 204 is that the distribution system 202 computing resources (e.g. publishing resource records 26) are not utilized needlessly.

In a further embodiment B for the component 204, the signing system 204 would (1) receive the registry data 23, (2) would consult the generation instructions 105 (and/or associated signing identifier(s) 110) in order to identify which of the resource records 26 are to remain unsigned and those to be signed (e.g. the signing identifier(s) 110 indicate that the record type(s) 26c are to be unsigned/signed), (3) would generate the DNS data 34 using the generation instructions 105, and (4) would send the DNS data 34 to the distribution system 202, which would send the DNS data 34 in the transmission paths 22a,11a to the DNS 30 that bypass the registry database 18. In this embodiment B for the component 204, the signing system 204 is used to generate the DNS data 34, while the distribution system 202 is used to publish the generated DNS data 34 to the DNS 30.

In a further embodiment C for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed (e.g. the signing identifier(s) 110 indicate that the record type(s) 26c are to be unsigned/signed), (3) the record selection module 200 would send the registry data 23 and identify those resource records 26 (e.g. a first record portion) as unsigned to the distribution system 202 in order for the distribution system 202 to generate the unsigned portion of the DNS data 34 using the generation instructions 105 and the registry data 23, (4) the record selection module 200 would identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11a to the DNS 30 that bypasses the registry database 18. In this embodiment C for the component 204, one advantage is that the signing system 204 computing resources (e.g. for signing the DNS data 34) are not utilized needlessly for resource records 26 that are to remain unsigned.

In a further embodiment D for the component 204, (1) the record selection module 200 would receive the registry data 23, (2) the record selection module 200 would consult the generation instructions 105 (and/or associated signing identifier(s) 110) in order to identify which of the resource records 26 are to remain unsigned and those that are to be signed (e.g. the signing identifier(s) 110 indicate that the record type(s) 26c are to be unsigned/signed), (3) the record selection module 200 would send the registry data 23 and identify those resource records 26 (e.g. a first record portion) as unsigned to the signing system 204 in order for the distribution system 202 to generate the unsigned portion of the DNS data 34 using the generation instructions 105 and the registry data 23, (4) the record selection module 200 would also identify those resource records 26 as signed (e.g. a second record portion) to the signing system 204 in order for the signing system 204 to generate the signed portion of the DNS data 34 using the generation instructions 105 and the registry data 23, and (5) one or more of the components 200,202,204 would send both the signed and unsigned portions of the DNS data 34 in the transmission path 11a to the DNS 30 that bypasses the registry database 18. In this embodiment D for the component 204, one advantage is that the signing system 204 computing resources (e.g. for signing the DNS data 34) are not utilized needlessly for resource records 26 that are to remain unsigned.

It is recognized that for this embodiment D for the component 204, the signing system 204 does receive all of the registry data 23 for use in generation of the DNS data 34, however identification of which resource records 26 are to be unsigned (the first record portion) and which resource records 26 are to be signed (the second record portion) has already been processed by the record selection module 200 in advance of sending the registry data 23 to the signing system 204. As such, in this embodiment D for the component 204, a further advantage is that the signing system 204 computing resources (e.g. for identifying which of the resource records 26 are for signing or not) are not utilized needlessly for resource records 26 that are to remain unsigned. Identification of the first portion of the resource records 26 and the second portion of the resource records 26 can be embodied as a checklist 27 (indicating whether a particular resource record 26 of the set of resource records 26 sent to the signing system 204 is to be signed or unsigned), such that the resource records 26 identified as unsigned are listed/generated in the checklist 27 prior to sending the registry data 23 to the signing system 204. Accordingly, both the registry data 23 and the checklist 27 are received by the signing system 204, such that the signing system 204 can consult the checklist 27 and send the second portion of the resource records 26 to a signing module 204b (of the signing system 204) and the first portion of the resource records 26 in a path that bypasses the signing module 204b.

Generation of Next Version DNS Data 34a for Transmission to the Publication Storage 19

Referring again to FIGS. 3 and 7, there are considered a number of different operational embodiments of the DNS publication service 22. It is recognized that each of the operational embodiments for each respective component 200,202,204 could also be compatible with the other operational embodiments for each of the other respective components 200,202,204. It is envisioned that the particular next version DNS data 34a (e.g. provisioned as signed or unsigned for the publication storage 19) can be generated and stored (e.g. to the publication storage 19) as described. It is recognized that the next version DNS data 34a and the current version DNS data 34 are in existence concurrently (as generated by the DNS publication service 22), such that the current version DNS data 34 is operational in the DNS 30 while the next version DNS data 34a is sent to the publication storage 19 and tested/validated.

Concerning the obtaining/receipt of the registry data 23 via the record selection module 200. In one embodiment A for the component 200, the registry data 23 (pertaining to the record types 26c of the DNS data 34) could be pushed to the record selection module 200 by the registry operator 20 (as collected from the registry database 18), upon the registry operator 20 processing a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or for existing domain name(s) 14. In a further embodiment B for the component 200, the registry data 23 (pertaining to the record types 26c of the DNS data 34) could be pulled by the record selection module 200 from the registry operator 20 (as collected from the registry database 18), upon monitoring and detecting by the record selection module 200 that the registry operator 20 processed a registry transaction 115 (e.g. for example an update/change/create/delete EPP operation as triggered by the registrar 16 and/or the registrant 12 for one or more domain name(s) 14) affecting one or more of the registry data 23 stored in the registry database 18 that could also affect operation of the DNS 30 for the one or more domain name(s) 14. This registry transaction 115 could be associated with new domain name(s) 14 or existing domain name(s) 14. It is recognized that any/all of the functionality of the record selection module 200 and the distribution system 202 can be combined in one system/module as desired, or can be separated as described by example only.

Signing Module 204b

For example, referring to FIG. 3, the signing module 204b performs the function of generating the actual signatures (for population of respective signature records of the DNS data 34) using the private keys defined in the generation instructions 105 of the domain. The signing module 204b could be a hardware security module (HSM), as a physical computing device used to safeguard and manage digital keys for strong authentication and provision of cryptoprocessing. The HSM modules 204b can be embodied in the form of a plug-in card or an external device (containing one or more secure cryptoprocessor chips) that attaches directly to a computer or network server of the signing system 204. For example, the HSM module(s) 204b can be used to store the key material used to sign the zone files/records (e.g. the DNS data 34). A recognized open source tool for managing signing of DNS zone files using HSM 204b is OpenDNSSEC. In terms of a DNS record module 204a, this module can be responsible for building the RR sets 26d of the DNS data 34, in particular requesting signatures from the signing module 204b and incorporating the received signatures using DNS syntax (e.g. stored in the generating instructions 105) to build/generate the DNS data 34. As such, the signing system 204 can be implemented as a multifunctional module for both the signature generation and RR set 26d generation functions. Alternatively, the signing system 204 can be subdivided into dedicated one or more signing modules 204b and dedicated one or more DNS record modules 204a.

It is also recognized that in the case of the unsigned zone, the distribution system 202 can include a DNS record module 204a for generating the unsigned DNS data 34, or can rely upon a respective DNS record module 204a of the signing system 204 in order to generate the unsigned DNS data 34 for the unsigned zone. Further, it is recognized that the distribution system 202 and/or the signing system 204, depending upon the embodiment A,B,C,D of the components 200,202,204 implemented, can have a publication module 202a for use in receiving the DNS data 34 once generated and then sending/transmitting to the DNS 30 using the transmission path 11a,11b. For example, the publication module 202a would be aware of the network 11 addresses for one or more of the DNS servers 32 associated with the DNS 30, in order to coordinate reception of the live version DNS data 34 (e.g. as generated by the DNS record module 204a) and then subsequent transmission over the network path 11a to one or more of the DNS servers 32 of the DNS 30. For example, the publication module 202a would be aware of the network 11 address for the publication storage 19, in order to coordinate reception of the next version DNS data 34a (e.g. as generated by the DNS record module 204a) and then subsequent transmission over the network path 11b to the publication storage 19.

The signing module 204b can be embodied as a DNSSEC key management and a signing appliance like Secure64® DNS Signer, BlueCat Networks, Xelerance DNSX Secure, Signer, and Infoblox. Such appliances may provide various aspects of key management and zone signing, but require hardware to be installed. Further, there may also be steps taken outside of this system to complete the process of making a domain name signed. Specifically, the parent zone would be modified to add a DS record 26 which matches a DNSKEY in the apex.

DNS 30 and DNSSEC

Referring to FIGS. 1 and 2 and 3, the DNSSEC process (and for that matter the testing facilities 21) is utilized by the DNS servers 32 of the DNS 30 to utilize digitally signed DNS data 34 (e.g. digitally signed DNS records also referred to as one or more Resource Record sets (RR set) 26d) at the authoritative DNS server (of the DNS servers 32) with encryption technology (e.g. public-key cryptography). It is also recognized that some of the resource records 26 (as part of the RR set(s) 26d) can also be unsigned (i.e. do not include a respective RRSIG record 26b associated as part of the RR set 26a of a particular record type 26c). Some of the registry data 23 for the resource records 26, used as part of the DNS data 34, are obtained from the registry database 18 associated with the particular domain name 14 (e.g. website URL), e.g. obtained by the DNS publication service 22 from the registry data base 18 and/or provided to the DNS publication service 22 by the registry operator 20, for example. In particular, it is recognised that the registry data 23 of the registry database 18 only contain unsigned registry data 23. As such, any record(s) contained in the RR set 26d relating to DNSSEC (e.g. the RRSIG record 26a) is/are incorporated into the RR set 26d by a signing system 200 of the DNS publication system 10, see FIG. 4, and as such are not obtained by the DNS publication service 22 from the registry database 18 in performance of generating the DNS data 34 for subsequent publication to the DNS servers 32 of the DNS 30. Other DNSSEC related resource records 26 of the DNS data 34 can include records such as but not limited to: DNS Public Key (DNSKEY); Delegation Signer (DS); Next Secure (NSEC/NSEC3).

The testing facilities 21 could be implemented as a set of instructions stored in a storage and executing on a computer processor (e.g. a server) in order to perform their respective functions (e.g. processing) on the registry data 23 and/or the DNS records 26. Alternatively, the testing facilities 21 could be implemented as a hardware (e.g. a solid state device) having storage and one or more computer processors in order to perform their respective functions (e.g. processing) on the registry data 23 and/or the DNS records 26. Alternatively, the testing facilities 21 could each implemented as a combination of a set of instructions stored in a storage and executing on a computer processor and a hardware (e.g. a solid state device) having storage and one or more computer processors in order to perform their respective functions (e.g. processing) on the registry data 23 and/or the DNS records 26. In terms of the functionality of the testing facilities/service 21, the current version DNS data 34 would be used as a baseline version by the testing service 21 in next to compare against/with the next version DNS data 34a. For example, as each next version DNS data 34a is generated, the testing service 21 would receive the generated next version DNS data 34a and compare each of the DNS records 26 in the next version DNS data 34a against each of the DNS records 26 contained in the current version DNS data 34, in order to determine: 1) every DNS record 26 requiring a signature contains a signature record 26a; 2) every zone defined in the generating instructions 105,105a is present and contains the requisite DNS records 26; determine if the signature records 26a contained are valid signatures; and/or the validity of the zone is not affected by the changes present in DNS records 26 in the next version DNS data 34a. It is recognised that the above is not an exhaustive list of types of operations that can be conducted by the testing facilities 21.

As further described, it is also recognized that the current version DNS data 34 is not stored in the registry data base 18, rather the DNS data 34 is generated (on demand) by the DNS publication service 22 as needed (e.g. due to recognized/identified DNS pertinent changes to the registry data 23 stored in the registry database 18—and/or as needed when it needs to be signed as pertaining to TTL considerations or otherwise as relationship(s) of the data dictate). Once generated by the DNS publication service 22, the DNS data 34 can be submitted directly to the DNS servers 32 of the DNS 30 using transmission path 11a, or as next DNS data 34a to the publication storage 19 via the network path 11b, as dictated by the respective publication identifiers 39,39a.

In general, the DNS data 34 (aka DNS records or zone files referred to as a Resource Record transfer/transaction 34) are instructions that are published (e.g. transmitted or eventually transmitted to the DNS servers 32) by the DNS publication service 22 to the (authoritative) DNS servers 32. The DNS data 34 provides information about a domain name 14 can include what IP address is associated with that domain name 14 and how to handle requests (e.g. DNS requests from the users 13) associated with network resources 31 for that domain name 14. For example, a DNS record 26 can be defined as a single entry of the DNS data 34 that gives zone instructions on how to handle any given DNS 30 related request based on record type 26c. In general, most every DNS record 26 has at least three pieces of information, namely: a Record Name (i.e. label); Record Value/Data; and Time to Live (TTL).

These DNS records 34 consist of a series of stored records written in what is known as DNS syntax. DNS syntax can be a string of characters used as commands, which instruct the DNS server 32 what to do (e.g. provides the answer for a DNS query request from the network user 13) upon receiving a DNS lookup request from the network user 13, for example. All DNS records 34 can also have a 'TTL', which stands for time-to-live, and indicates how often a DNS server 32 would refresh that particular DNS record 34. Accordingly, all domains are required to have at least a few essential DNS records 34 for the user 13 to be able to access the website(s) associated with the domain name 14, amongst other optional additional DNS 30 implemented functionality.

Referring again to FIG. 2, for signed versions of the DNS data 34, i.e. those including the RRSIG 26a, when DNSSEC is used (i.e. the particular RR set 26d is digitally signed), each answer provided by the DNS server 32 (e.g. to a received DNS lookup of the user 13) would contain at least one RRSIG record 26a, in addition to other record types 26c that were requested. As such, the RRSIG record 26a represents a digital signature of the answer DNS resource record set, i.e. RR set 26d containing one or more resource records 26 of the same record type 26c. Further, the digital signature contained in the RRSIG record 26a can be verified by the server (e.g. checking as compared to resolving—resolver/validating server used by the user 13 in processing the DNS lookup/access to the network resource 31) communicating with the DNS server 32 by locating the correct public key found in the DNSKEY record of the DNS data 34. It is further recognized that each RR set 26d can contain one or more resource records 26 of the same record type 26c. Further, each RR set 26d can be signed (and thus contain a respective RSIG record 26a—e.g. when rolling a ZSK you can include dual signatures to sign), or can be unsigned (and thus not contain at least one respective RRSIG record 26a). It is also recognized that, as shown by example in FIG. 2, that each set of DNS data 34 (e.g. also referred to as a set of DNS records or RR transfer set or RR transaction set) can contain one or more RR set(s) 26d. Also, preferably, each set of DNS data 34 only contains one RR set 26d for a particular resource record type 26c (e.g. signed or unsigned).

In view of the above, it is recognized that utilization of the DNS data 34, via the DNS 30, can facilitate determination by a security-aware DNS resolver (the one or more network server(s) assisting the network user 13 in navigating to the network 11 (e.g. IP) address the user wishes to access—i.e. for interaction with the respective network resource(s) 31) if a) the answer (to a DNS lookup request) the resolver server received was correct (i.e. secure), b) whether the DNS server 32 for the domain being queried doesn't support DNSSEC (insecure), c) if there is some sort of error with the answer obtained from the DNS server 32, and/or d) that the authoritative server 32 that was queried is at least one of a plurality of servers that is/are authoritative to send the response. Further, it is recognized that, in general, the DNS data 34 published to the DNS 30 is useful in facilitating that the correct DNSKEY record can be found via an Authentication Chain, starting with a known good public key (facilitating a secure entry point) for a Trust Anchor, preferably at the DNS root. This public key can then be used by the respective servers (e.g. resolver server) to verify a delegation signer (DS) record associated with the respective domain name 14 of interest to the network user 13. For example, a DS record in a parent domain (DNS zone) can then be used to verify a DNSKEY record in a subdomain, which can then contain other DS records to verify further subdomains.

In view of the above, it is recognized that the registry data 23, some of which can be obtainable from the registry database 18 for the particular domain name 14, can be pertinent to the resource records 26 such as but not limited to: A Records 26—and/or AAA Records 26 which are the most basic type of DNS record and are used to point a domain or subdomain to an IP address (e.g. assigning a value to an A record is associated with an IP address to where the domain or subdomain should point and a TTL; CNAME records 26—which are used to point a domain or subdomain to another hostname, for example as a means of being able to change an IP address of a server or cluster of servers; Mail Exchanger (MX) records 26—which are used to help route email according the domain owners preference, such that the MX record itself specifies which server(s) to attempt to use to deliver mail to when this type of request is made to the domain; and TXT records—which are used to store any text-based information, for example used to hold SPF data and verify domain ownership. Other registry data 23 pertinent to resource records 26 can include: a NS record 26 (more common)—storing the name server for a DNS entry; DNSKEY record 26—the 'DNS Key Record' contains a public key used to verify signatures; CDNSKEY record 26—a child copy of the DNSKEY record, meant to be transferred to a parent; a standardized network protocol used on IP networks; DNAME record 26—the 'delegation name' record creates a domain alias, just like CNAME, but this alias will redirect all subdomains as well. In general, it is recognized that only unsigned registry data 23 is contained in the registry database 18.

Further, is also recognized that those resource records 26 of the DNS data 34,34a that are DNSSEC related, e.g. the RRSIG record 26a, the DS record 26, the DNSKEY records 26, etc. are also not stored in the registry database 18. As such, the resource records 26 of the DNS data 34,34a that are DNSSEC related can already be known to the DNS publication service 22 (e.g. to the signing system 204 and/or the distribution system 202 as per the provisioning 107 of the generation instructions 105,105a), in advance of receiving (or otherwise obtaining) the relevant registry data 23 from the registry database 18 in order to perform the generation of the DNS data 34,34a (e.g. for the purposes of configuration of a new domain name 14 added to the domain/zone and/or an update to the DNS data 34,34a based on registry data 23 related transactions implemented by the registry operator 20 on the registry data 23 stored in the registry database 18). Also recognized is that the TTL parameter of the DNS data 34,34a can play a role in triggering an update to the DNS data 34, as performed by the DNS publication system 10.

Referring again to FIG. 2, DNSSEC was designed to deal with cache poisoning and a set of other DNS vulnerabilities such as man in the middle attacks and unauthorized data modification in authoritative servers. Its major objective is to provide origin authentication and integrity protection for the DNS data 34. The public key infrastructure (PKI) can be used as means of public key distribution for the signed RR set(s) 26d of the DNS data 34. DNSSEC provides a verification mechanism for the DNS data 34 and is not an encryption mechanism. It allows a security-aware resolver 35 (see FIG. 1) to verify that the zone data that has been received is signed by the administrator of the zone who holds the private key.

As discussed, a zone may have one or more key pairs, each of which includes private key and public key. The private keys may be stored securely in the DNS publication service 22 (e.g. in the HSM 204b—see FIGS. 3,4) and used to sign zone data (e.g. the DNS data 34). The public keys may be stored in the DNS publication service 22 and also stored in the signed DNS data 34 as DNSKEY resource records. The public keys are used to verify zone data. DNSKEY records typically have the following data elements: Flags—"Zone Key" and "Secure Entry Point"; Protocol—fixed value of 3 (for backwards compatibility); Algorithm—the public key's cryptographic algorithm; and Public key—public key data. A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DNSKEY resource records and are used to build a chain of authority to the data that is validated.

The RRSIG resource record 26a (see FIG. 2) holds the DNSSEC signature of a resource record set RRset 26d (one or more DNS records 26 with the same name, class, and type). DNSSEC enabled resolvers 35 (see FIG. 1) can verify the signature with a public key stored in the DNSKEY-record. The RRSIG records can have the following data elements: Type Covered—DNS record type that this signature covers; Algorithm—cryptographic algorithm used to create the signature; Labels—number of labels in the original RRSIG-record name (used to validate wildcards); Original TTL—TTL value of the covered record set; Signature Expiration—when the signature expires; Signature Inception—when the signature was created; Key Tag—a short numeric value which can help quickly identify the DNSKEY-record which can be used to validate this signature; Signer's Name—name of the DNSKEY-record which can be used to validate this signature; and Signature—cryptographic signature. Further, it is recognized that the DNSKEY RRs can be signed by both active KSKs and (providing for higher level security over simply using one key—e.g. the DNSKEY—alone) ZSKs. Accordingly, DNS 30 can be operated using one key (e.g. DNSKEY) or can have key sets (e.g. ZSK and KSK set).

The NSEC resource record 26 can list two separate things: the next owner name (in the canonical ordering of the zone) that contains authoritative data or a delegation point NS RRset 26d, and the set of RR types 26c present at the NSEC RR's owner name. The complete set of NSEC RRs 26 in a zone indicates which authoritative RR sets 26d exist in a zone and also form a chain of authoritative owner names in the zone. These resource records 26 can be used by resolvers 35 to verify the non-existence of a record name and type 26c as part of DNSSEC validation. NSEC-records can have the following data elements: Next domain name—the next record name in the zone (DNSSEC sorting order); and Record types—the DNS record types 26c that exist for the name of this NSEC-record.

The NSEC3 Resource Record (RR) 26 can provide authenticated denial of existence for DNS RR sets 26d. The NSEC3 RRs 26 have the same functionality as NSEC RR 26, except NSEC3 uses cryptographically hashed record names to thwart enumeration of the record names in a zone. An NSEC3-record can link to the next record name in the zone (in hashed name sorting order) and can list the record types 26c that exist for the name covered by the hash value in the first label of the NSEC3-record's own name. These resource records 26 of the DNS data 34 can be used by the resolvers 35 to verify the non-existence of a record name and type as part of DNSSEC validation. NSEC3-records 26 can have the following data elements: Hash Algorithm—the cryptographic hash algorithm used; Flags—"Opt-out" (indicates if delegations are signed or not); Iterations—how many times the hash algorithm is applied; Salt—salt value for the hash calculation; Next Hashed Owner Name—the name of the next record in the zone (in hashed name sorting order); and Record Types—the record types 26c that exist for the name covered by the hash value in the first label of the NSEC3-record's own name.

Method 300

Figure 4:
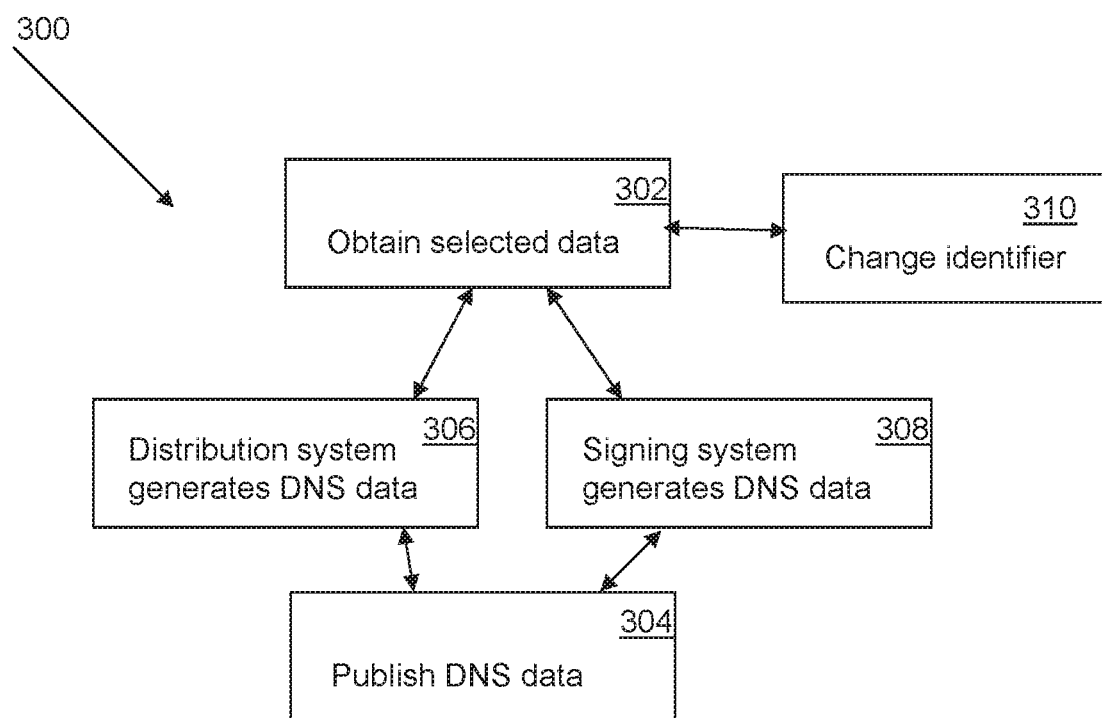
FIG. 4 is an example implementation of the DNS publication service of FIG. 3.

Referring to FIG. 4, shown is a method 300 for signing the plurality of Domain Name System (DNS) records 34a,34a for the domain name 14, whether for the live version DNS data 34 or the test version DNS data 34a. It is recognised that the same signing method 300 embodiment can be used in order to sign resource records 26 in the live version DNS data 34 as well as in the test version DNS data 34a. It is also recognised that different signing method 300 embodiments can be used in order to sign resource records 26 in the live version DNS data 34 as compared to those in the test version DNS data 34a.

In general, the method 300 comprises a step 302 of obtaining by a record selection module 200 selected data of registry data 23 associated with the domain name 14 in the registry database 18; a further step 304 of implementing a distribution system 202 for coordinating the publishing/storing of the set of DNS records 34 (e.g. in the DNS 30 or the publication storage 19) in a respective transmission path 11a,11b that bypasses storing of the signed DNS record in the registry database 18, the set of DNS records 34,34a generated based on a signing identifier 110,110a (designating the selected data as to be signed or not signed) on how to generate the set of DNS records 34,34a by either:

a) sending 306 the selected data to the DNSSEC signing system 204 for subsequent direct inclusion as the signed DNS record in the set of DNS records 34 by the DNSSEC signing system 204 using the set of generation instructions 105,105a; or b) including 308 the selected data as an unsigned DNS record in the set of DNS records 34 by the distribution system 202 using the set of generation instructions 105,105a wherein the transmission path 11a,11b also bypasses the at least one signing module 204b of the DNSSEC signing system 204.

As discussed above, the DNSSEC signing system 204 has at least one signing module 204b for digitally signing the selected data of the registry data 23, the digitally signing using one or more signing keys (SK) to generate a signed DNS record, the one or more signing keys associated with the registry data 23 of the domain name 14. For example, the unsigned DNS record can be a Name Server (NS) record. For example, the signed DNS record can be a Delegation Signer (DS) record. For example, the set of DNS records 34,34a with the signed DNS record also includes a public key of the one or more signing keys as a DNSKEY record.

In terms of step 306, the distribution system 202 can consult the signing identifier 110,110a before sending of the selected data of the registry data 23 to the DNSSEC signing system 204. It is also recognised that the record selection module 200 can be incorporated as part of the distribution system 202. It is also recognised that the distribution system 202 can decide to bypass the signing system 204 for unsinged records 26.

As an option in step 306, the distribution system can generate a checklist 27 for separating the selected data into a first portion of the registry data 23 and a second portion of the registry data 23, the first portion of the registry data 23 for inclusion in the set of DNS records 34,34a as unsigned records and the second portion of the registry data 23 for inclusion in the set of DNS records 34,34a as signed records, the distribution system 202 sending the checklist 27 with the selected data to the DNSSEC signing system 204.

As an option in step 308, the DNSSEC signing system 204 can incorporate the first portion of the registry data 23 in the set of DNS records 34 in a path that bypasses the at least one signing module 204b and incorporates the second portion of the registry data 23 in the set of DNS records 34,34a using one or more digital signatures as obtained from the at least one signing module 204b.

As an option in step 308, the DNSSEC signing system 204 can generate a checklist 27 for separating the selected data into the first portion of the registry data 23 and the second portion of the registry data 23, the first portion of the registry data 23 for inclusion in the set of DNS records 34,34a as unsigned records and the second portion of the registry data 23 for inclusion in the set of DNS records 34,34a as signed records.

As an option in step 308, the DNSSEC signing system 204 can incorporate, e.g. using the checklist 27, the first portion of the registry data 23 in the set of DNS records 34,34a in a path that bypasses the at least one signing module 204b and incorporates the second portion of the registry data 23 in the set of DNS records 34,34a using one or more digital signatures as obtained from the at least one signing module 204b.

Signing Identifiers 110,110a

As noted above, the signing identifier 110,110a can be defined as a presence of a DNSSEC record flag (e.g. indicator) in the set of generating instructions 105,105a used to generate the set of DNS records 34,34a. Using FIG. 2 as an example, the signing identifier 110,110a can be assigned to each resource record type 26c that is defined to include the RRSIG record 26a of the signed version of the RR set 26d for the respective selected data of the registry data 23 (e.g. the second portion of the registry data 23). Therefore, for example, the instructions for generating the RRSIG record flag of the RR set 26d in the generating instructions 105 can be defined as the signing identifier 110,110a. In other words, the record generation module 204a, when following the generating instructions 105, would include the RRSIG record flag (as one example of the signing identifier 110, 110a) for a particular resource record type 26c and thus instruct the at least one signing module 204b to generate a signature using the set of signing keys SK designated for the domain name 14. It is also recognized that the presence of other DNSSEC records (e.g. DS record, DNSKEY, etc.) associated with the generating instructions 105,105a can be used as indication (e.g. as a signing identifier 110,110a) by the record generation module 204a that the DNS data 34,34a should contain signed DNS records 26.

In the general case where there is an absence of any DNSSEC record flags in the generating instructions 105, 105a the record generation module 204a can use this absence of any DNSSEC record flags pertaining to the RR sets 26d (for the domain name 14) to indicate that the domain name 14 is an unsigned domain. Therefore, for example, the absence of the RRSIG record flag of the RR set 26d in the generating instructions 105,105a can be defined as the signing identifier 110,110a (i.e. indicating the unsigned designation). In other words, the record generation module 204a, when following the generating instructions 105,105a would note the absence of the RRSIG record flag (as one example of the signing identifier 110,110a) for a particular resource record type 26c and thus not instruct the at least one signing module 204b to generate a signature using the set of signing keys SK designated for the domain name 14. It is also recognized that the absence of other DNSSEC records (e.g. DS record, DNSKEY, etc.) associated with the generating instructions 105,105a can be used as indication by the record generation module 204a that the DNS data 34 should contain one or more unsigned DNS records 26.

Further to the above, it is also recognized that the signing identifier 110,110a can be embodied as a defined identifier that is other than presence/absence of DNSSEC records in the generating instructions 105, 105a. For example, the signing identifier 110,110a can be a defined signing flag (something other than a defined DNSSEC record type incorporated in one or more of the RR set records 26d of the DNS data 34,34a associated with none, or one or more resource record types 26c in the generating instructions 105,105a. Accordingly, the embodiment of the flag used as the signing identifier 110,110a is such that the flag value, and/or the flag field itself, is not explicitly included in the RR set records 26d of the DNS data 34,34a. As such, the flag/flag field is defined outside of and record field(s) and/or record field values contained in the DNS data 34,34a.

For example, the defined signing flag (as the signing identifier 110,110a) can be a flag containing a "signed designation" or an "unsigned designation" for the entire domain pertaining to the domain name 14. For example, for an unsigned domain, the signing identifier can be a single flag for the entire set of registry data 23 (pertaining to the DNS records for the domain name 14) in order to indicate the domain name 14 as an unsigned domain (i.e. having the absence of any DNSSEC related records in the DNS data 34,34a).

A further example, the defined signing flag (as the signing identifier 110,110a) can be a flag containing a "signed designation" for the entire domain pertaining to the domain name 14. For example, for the signed domain, the signing identifier can be a single flag for the entire set of registry data 23 (pertaining to the DNS records for the domain name 14) in order to indicate the domain name 14 as a signed domain (i.e. having the presence of a plurality of DNSSEC related records in the DNS data 34,34a for all of the respective resource record types 26c).

A further example, the defined signing flag (as the signing identifier 110,110a) can be a respective flag of a plurality of flags containing a "signed designation" for each of the resource record types 26c in the entire domain pertaining to the domain name 14. For example, for the signed domain, the signing identifier can be a respective flag assigned on per resource record type 26c basis for the entire set of registry data 23 (pertaining to the DNS records for the domain name 14), in order to indicate the domain name 14 as a signed domain (i.e. having the presence of a plurality of DNSSEC related records for at least one resource record type 26c in the DNS data 34,34a).

If DNSKEYS are established in the signing system, the mere presence of the keys for a particular zone. It is recognized that one or more of the record types can be signed/unsigned in the zone pertaining to the keys associate with the zone in the instructions (e.g. as one embodiment of the signing identifier 110).

The method 300 can also include the optional step 310 of modifying the signing identifier 110 by changing from an unsigned designation to a signed designation (e.g. based on a decision of the registrant 12 and/or registrar 16). Step 310 can include a receipt module (e.g. the record selection module 200) for receiving a request to change the signing identifier 110,110a and for facilitating the changing of the signing identifier 110,110a in the generating instructions 105,105a from the unsigned designation to the signed designation.

The method 300 can also include the optional step 310 of modifying the signing identifier 110,110a by changing from a signed designation to a signed designation. (e.g. based on a decision of the registrant 12 and/or registrar 16). Step 310 can include a receipt module (e.g. the record selection module 200) for receiving a request to change the signing identifier 110,110a and for facilitating the changing of the signing identifier 110,110a in the generating instructions 105,105a from the signed designation to the unsigned designation.

The changing can be implemented by (e.g. an administrator of the DNS publication service 22): inhibiting the transmission of the set of DNS records 34,34a (e.g. disabling operation of the publication module 202a); provisioning a new set of generation instructions 105,105a to include the signed/unsigned designation change (e.g. signed to unsigned or unsigned to signed); and reenabling the transmission of the set of DNS records 34 (reestablishing operation of the publication module 202a).

Once the signing identifier 110,110a change has been accomplished, (i.e. the generation instructions 105 have been provisioned to incorporate the identifier change), the step 306 of the distribution system 202 can be further triggered to: obtain a further instance of the selected data of the registry data 23; and send the further instance to the DNSSEC signing system 204 in order for the further instance of the registry data to be used to generate a further signed DNS record using the at least one signing module 204b (e.g. changing the selected data in the DNS data 34,34a to signed what was previously unsigned). For example, this alternative embodiment can be implemented for one or more resource record types 26c.

Alternatively, once the signing identifier 110,110a change has been accomplished, (i.e. the generation instructions 105,105a have been provisioned to incorporate the identifier change), the step 306 of the distribution system 202 can be further triggered to: obtain a further instance of the selected data of the registry data 23; and bypass sending of the further instance to the DNSSEC signing system 204 in order for the further instance of the registry data to be used to generate a further unsigned DNS record by bypassing the at least one signing module 204b (e.g. changing the selected data in the DNS data 34 to unsigned what was previously signed). For example, this alternative embodiment can be implemented for one or more resource record types 26c.

Finally, the further set of DNS records 34 is published in the DNS 30 by sending the further set of DNS records 34 to the one or more authoritative servers 32 of the DNS 30 (or to the publication storage 19 as dictated by the publication identifiers 39,39a) by the DNS publication service 22, the further set of DNS records including the further signed (or unsigned) DNS record.

Accordingly, the DNS publication service 22, with the option to use or not use the signing system 204, and further with the option to use or not use the signing module 204b, can be utilized flexibly as a gateway by the registry operator 20 (or in connection with the registrant 12 and/or the registrar 16) to provide (and to straightforwardly change) signed records to unsigned records (of the DNS data 34) or unsigned records to signed records (of the DNS data 34) on a per domain basis, as dictated using the publication identifiers 39,39a described by example. Accordingly, the DNS publication service 22, with the option to use or not use the signing system 204, and further with the option to use or not use the signing module 204b, can be utilized flexibly as a gateway by the registry operator 20 (or in connection with the registrant 12 and/or the registrar 16) to provide (and to straightforwardly change via the publication identifiers 39,39a) signed records to unsigned records (of the DNS data 34,34a) or unsigned records to signed records (of the DNS data 34,34a) on a per resource record type 26c basis for the domain of the domain name 14.

Figure 5:
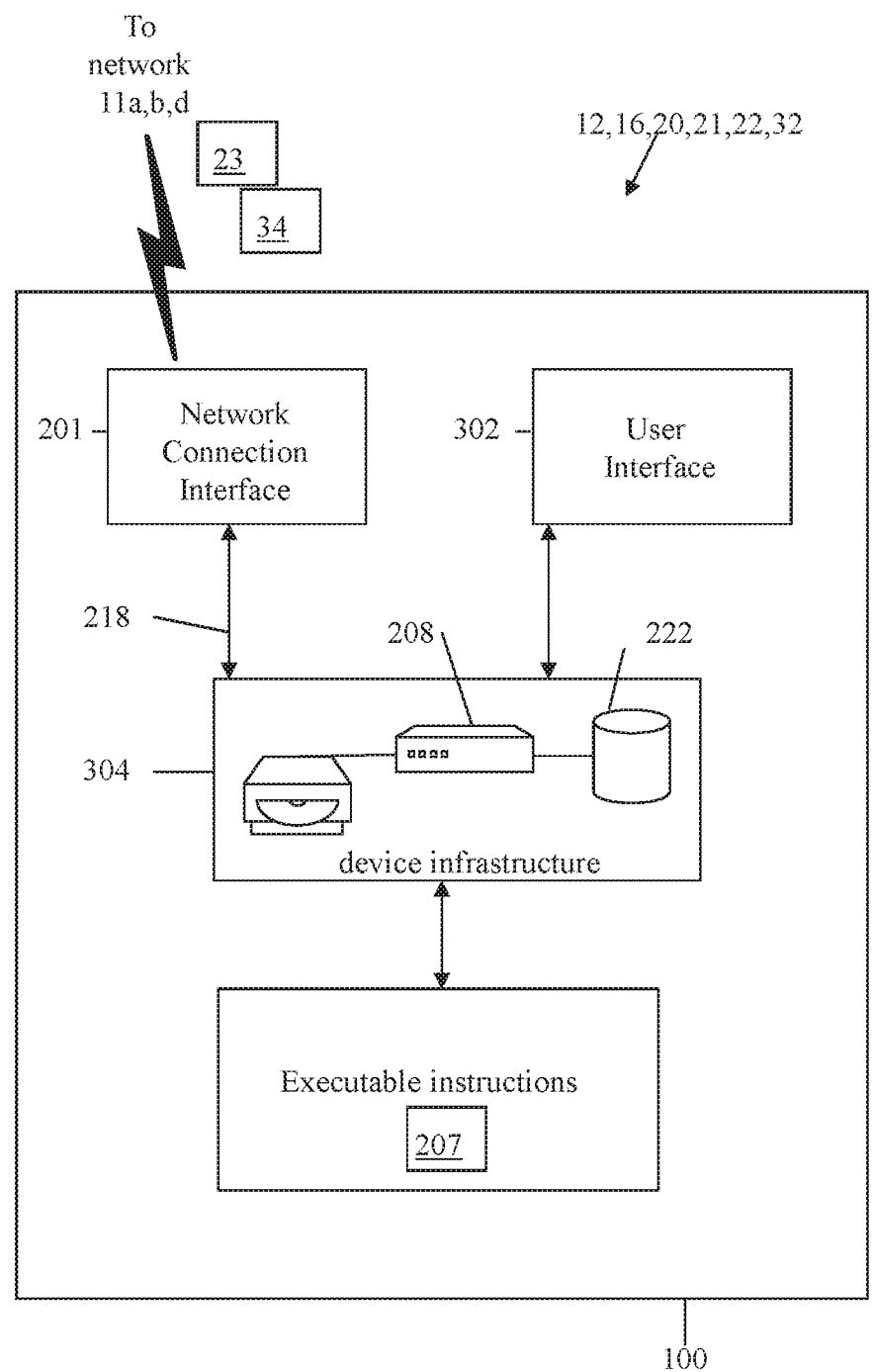
FIG. 5 is an example block diagram of computing devices implementing one or more components of the system of FIG. 1.

Referring to FIG. 5, shown is such that operation of the device 100 is facilitated by the device infrastructure 304. The device infrastructure 304 includes one or more computer processors 208 and can include an associated memory 222 (e.g. database 18,19). The computer processor 208 facilitates performance of the device 100 configured for the intended task (e.g. of the respective module(s) 200, 202, 204) through operation of the network interface 201, the user interface 302 and other application programs/hardware of the device 100 by executing task related instructions. These task related instructions can be provided by an operating system, and/or software applications located in the memory 222, and/or by operability that is configured into the electronic/digital circuitry of the processor(s) 208 designed to perform the specific task(s). Further, it is recognized that the device infrastructure 304 can include a computer readable storage medium coupled to the processor 208 for providing instructions to the processor 208 and/or to load/update the instructions 207 (e.g. modules 200, 202, 204 and/or instructions 105, 105a). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination. 267

Further, it is recognized that the computing device 100 can include the executable applications comprising code or machine readable instructions for implementing predetermined functions/operations including those of an operating system and the modules, for example. The processor 208 as used herein is a configured device and/or set of machine-readable instructions for performing operations as described by example above, including those operations as performed by any or all of the modules. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the modules may be implemented in hardware, software or a combination of both. Accordingly, the use of a processor 208 as a device and/or as a set of machine-readable instructions is hereafter referred to generically as a processor/module 208 for sake of simplicity. 269

It will be understood in view of the above that the computing devices 100 may be, although depicted as a single computer system, may be implemented as a network of computer processors, as desired.

As described above, the publication system 10 for concurrently publishing a current version 34 of a plurality of Domain Name System (DNS) records 26 for a domain name 14 and for storing a next version 34a of the plurality of DNS records 26 for the domain name 14 can be configured to include: a record selection module 200 for obtaining selected data 23 of registry data 23 associated with the domain name 14 stored in a registry database 18; a DNS Security (DNSSEC) signing system 204 having at least one signing module 204b for digitally signing the selected data 23 of the registry data 18, the digitally signing using one or more signing keys (SK) to generate a signed DNS record 26, the one or more signing keys associated with the registry data 23 of the domain name 18; a distribution system 202 for coordinating concurrent generation and transmission of the current version 34 and the next version 34a based on one or more publication identifiers 39,39a (designating the version 34,34a as "to be published" or "not published"—such that not published could mean that the next version DNS data 34a is sent to the publication storage 19 rather than the DNs 30), at least one of the current version 34 and the next version 34a could include one or more signed DNS records SR based on one or more signing identifiers 110,110a (designating the record 26 as to be signed or not signed) as generated by the DNSSEC signing system 204; the distribution system 202 and signing system 204 cooperating to: 1) generate the current version 34 according to a first set of generation instructions 105 and transmit according to one or more publication identifiers 39 the current version 34 (e.g. as the update version DNS data 34b as discussed by example below) to one or more authoritative servers 32 of the DNS 30 in a first transmission path 11a that bypasses storing of the current version 34 in the registry database 18; and 2) generate the next version 34a according to a second set of generation instructions 105a and transmit according to the one or more publication identifiers 39a the next version 34a to a publication storage 19 in a second transmission path 11b that bypasses storing of the next version 34a in the registry database 18 for subsequent testing; wherein the current version 34 and the next version 34a contain different versions of the plurality of DNS records 26 such that at least some of the DNS record 26 of the plurality of DNS records 26 contained in one of the current version 34 or the next version 34a is not contained (or is otherwise new or different) in the other of the current version 34 or the next version 34a.

For example, DNS record(s) 26 in the current version DNS data 34 are absent from the DNS record(s) 26 in the next version 34a (as well as in the resultant update version 34b). For example, DNS record(s) 26 in the current version DNS data 34 are modified as compared to similar (e.g. of the same record type) DNS record(s) 26 in the next version 34a (as well as in the resultant update version 34b). For example, DNS record(s) 26 in the next version DNS data 34a are absent (e.g. signifying a key rollover) from DNS record(s) 26 in the current version 34a (as well as in the resultant update version 34b).

What is claimed is:

1. A system for concurrently facilitating publishing a current version of a plurality of Domain Name System (DNS) records for a domain name and storing a next version of the plurality of DNS records for the domain name, the system comprising:
  a computer processor for executing a set of instructions stored on a computer storage for:
    obtaining selected data of registry data associated with the domain name stored in a registry database;
    digitally signing the selected data of the registry data, said digitally signing using one or more signing keys (SK) to generate a signed DNS record, the one or more signing keys associated with the registry data of the domain name;
    coordinating concurrent generation of the current version and the next version;

said digitally signing and said coordinating cooperating to:
a) generate the current version according to a first set of generation instructions and transmit the current version to one or more authoritative servers of the DNS in a first transmission path that bypasses storing of the current version in the registry database; and
b) while the current version is operational in the DNS, generate the next version according to a second set of generation instructions and transmit the next version to a publication storage for at least one of testing or validation by a processing facility in a second transmission path that bypasses storing of the next version in the registry database;
wherein the current version in the DNS and the next version in the publication storage contain different versions of at least some of the plurality of DNS records.

2. The system of claim 1 further comprising the computer processor for executing the set of instructions stored on the computer storage for selecting for publication or not of at least one of the current version or the next version, based on one or more publication identifiers.

3. The system of claim 1, wherein at least one signed DNS record is included in the plurality of DNS records of the next version.

4. The system of claim 1, wherein at least one signed DNS record is included in the plurality of DNS records of the current version.

5. The system of claim 1, wherein an unsigned DNS record included in the plurality of DNS records is a Name Server (NS) record.

6. The system of claim 1, wherein a signed DNS record included in the plurality of DNS records is a Delegation Signer (DS) record.

7. The system according to claim 1, wherein the plurality of DNS records also includes a public key of the one or more signing keys as a DNSKEY record.

8. The system of claim 1, wherein one or more publication identifiers are included in at least one of the first set of generation instructions and the second set of generation instructions.

9. The system of claim 8 further comprising utilizing the one or more publication identifiers in order to transmit from the publication storage of the next version as an update version to one or more authoritative servers of the DNS.

10. The system of claim 8, wherein the one or more publication identifiers includes an enable publication pointer facilitating said transmit of the next version as an update version.

11. The system of claim 10, wherein the enable publication pointer directs said transmit of the update version.

12. The system of claim 8, wherein the one or more publication identifiers includes an enable publication flag facilitating said transmit of the next version as an update version.

13. The system of claim 12, wherein the enable publication flag directs said transmit of the update version.

14. The system of claim 1 further comprising the processing facility configured for determining a pass or failure of the next DNS data.

15. The system of claim 14, wherein a mitigation step is performed in order to determine a reason in the event of said failure of the next DNS data as processed by the processing facility.

16. A method for concurrently facilitating publishing a current version of a plurality of Domain Name System (DNS) records for a domain name and storing a next version of the plurality of DNS records for the domain name, the method comprising:
obtaining selected data of registry data associated with the domain name stored in a registry database;
digitally signing the selected data of the registry data, said digitally signing using one or more signing keys (SK) to generate a signed DNS record, the one or more signing keys associated with the registry data of the domain name; and
coordinating concurrent generation of the current version and the next version by:
a) generating the current version according to a first set of generation instructions and transmit the current version to one or more authoritative servers of the DNS in a first transmission path that bypasses storing of the current version in the registry database; and
b) while the current version is operational in the DNS, generating the next version according to a second set of generation instructions and transmit the next version to a publication storage for at least one of testing or validation by a processing facility in a second transmission path that bypasses storing of the next version in the registry database;
wherein the current version in the DNS and the next version in the publication storage contain different versions of at least some of the plurality of DNS records.

17. The method of claim 16 further comprising selecting for publication or not of at least one of the current version or the next version, based on one or more publication identifiers.

18. The method of claim 16, wherein one or more publication identifiers are included in at least one of the first set of generation instructions and the second set of generation instructions.

19. The method of claim 18 further comprising utilizing the one or more publication identifiers in order to transmit from the publication storage of the next version as an update version to one or more authoritative servers of the DNS.

20. The method of claim 18, wherein the one or more publication identifiers includes an enable publication pointer facilitating said transmit of the next version as an update version.

21. The method of claim 18, wherein the one or more publication identifiers includes an enable publication flag facilitating said transmit of the next version as an update version.

* * * * *